(12) United States Patent
McPheeters et al.

(10) Patent No.: US 10,090,800 B2
(45) Date of Patent: Oct. 2, 2018

(54) SOLAR PANEL INSTALLATION SYSTEMS AND METHODS

(71) Applicant: Sunrun South LLC, San Luis Obispo, CA (US)

(72) Inventors: Greg McPheeters, Santa Clara, CA (US); Geno Viscuso, Shingle Springs, CA (US)

(73) Assignee: Sunrun South LLC, San Luis Obispo, CA (US)

( * ) Notice: Subject to any disclaimer, the term of this patent is extended or adjusted under 35 U.S.C. 154(b) by 0 days.

(21) Appl. No.: 14/819,397

(22) Filed: Aug. 5, 2015

(65) Prior Publication Data

US 2016/0043689 A1 Feb. 11, 2016

Related U.S. Application Data

(60) Provisional application No. 62/033,311, filed on Aug. 5, 2014, provisional application No. 62/075,607, filed on Nov. 5, 2014, provisional application No. 62/138,065, filed on Mar. 25, 2015, provisional application No. 62/187,995, filed on Jul. 2, 2015.

(51) Int. Cl.
| | |
|---|---|
| *A47B 97/00* | (2006.01) |
| *H02S 20/23* | (2014.01) |
| *F16B 2/06* | (2006.01) |
| *F16B 2/18* | (2006.01) |
| *F24S 25/61* | (2018.01) |
| *F24S 25/70* | (2018.01) |
| *H02S 20/30* | (2014.01) |
| *H02S 30/10* | (2014.01) |
| *F24S 25/60* | (2018.01) |

(52) U.S. Cl.
CPC .............. *H02S 20/23* (2014.12); *F16B 2/065* (2013.01); *F16B 2/185* (2013.01); *F24S 25/61* (2018.05); *F24S 25/70* (2018.05); *H02S 20/30* (2014.12); *H02S 30/10* (2014.12); *F24S 2025/6003* (2018.05); *F24S 2025/6008* (2018.05); *Y02B 10/12* (2013.01); *Y02E 10/47* (2013.01)

(58) Field of Classification Search
CPC ....... H02S 20/00; F16B 2/00; F16M 2200/00; F16M 13/00
See application file for complete search history.

(56) References Cited

U.S. PATENT DOCUMENTS

| | | |
|---|---|---|
| 5,556,222 A | 9/1996 | Chen |
| 6,017,008 A | 1/2000 | Farley |
| 6,277,069 B1 | 8/2001 | Gray |

(Continued)

OTHER PUBLICATIONS

Definition of "bore" provided by the Free Dictionary and found at http://www.thefreedictionary.com/bore.

*Primary Examiner* — Amy J. Sterling
(74) *Attorney, Agent, or Firm* — Kramer Levin Naftalis & Frankel LLP

(57) ABSTRACT

Solar panel installation systems are disclosed that reduce or eliminate the need for large, costly rails for mounting solar panels on an installation surface. The systems may include an array of framed solar modules supported above an installation surface using a number of height-adjustable base members. Adjacent solar modules in the array may be coupled to one another at or near their corners using module links that can structurally couple the frames of the adjacent solar modules together.

20 Claims, 49 Drawing Sheets

(56) References Cited

U.S. PATENT DOCUMENTS

| | | | |
|---|---|---|---|
| 7,314,331 B1 | 1/2008 | Koros et al. | |
| 7,758,502 B2 | 7/2010 | Phillips et al. | |
| 2008/0000173 A1* | 1/2008 | Lenox | F24J 2/5245 52/173.1 |
| 2009/0078299 A1 | 3/2009 | Cinnamon et al. | |
| 2010/0313506 A1 | 12/2010 | Schoell | |
| 2012/0097807 A1* | 4/2012 | Rees | F24J 2/5203 248/121 |
| 2012/0102853 A1 | 5/2012 | Rizzo | |
| 2013/0011187 A1 | 1/2013 | Schuit et al. | |
| 2013/0340358 A1 | 12/2013 | Danning | |
| 2014/0041706 A1 | 2/2014 | Haddock et al. | |
| 2014/0110543 A1* | 4/2014 | Aliabadi | H02S 20/23 248/201 |
| 2014/0202525 A1 | 7/2014 | Janssens et al. | |
| 2014/0326838 A1 | 11/2014 | West et al. | |

\* cited by examiner

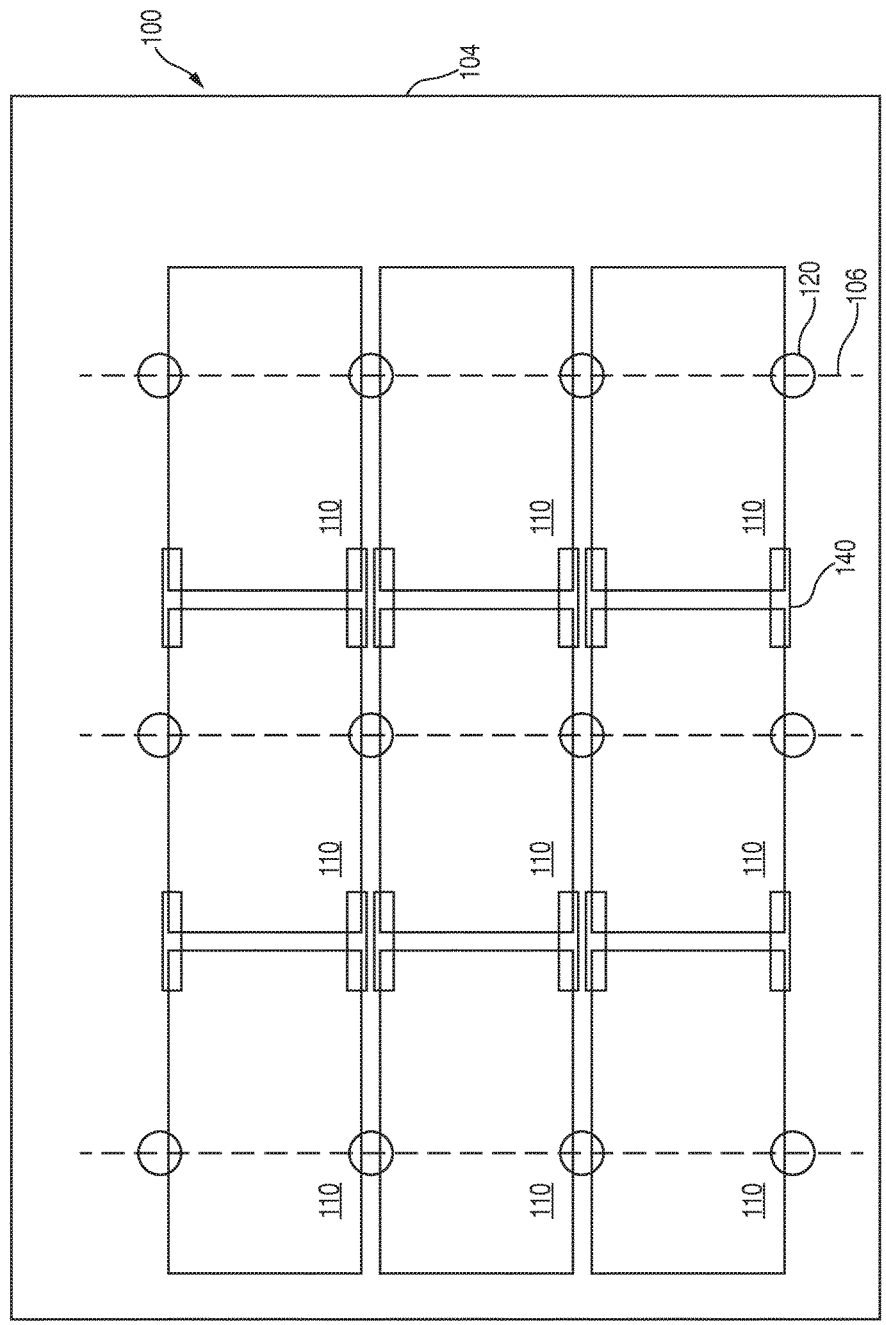

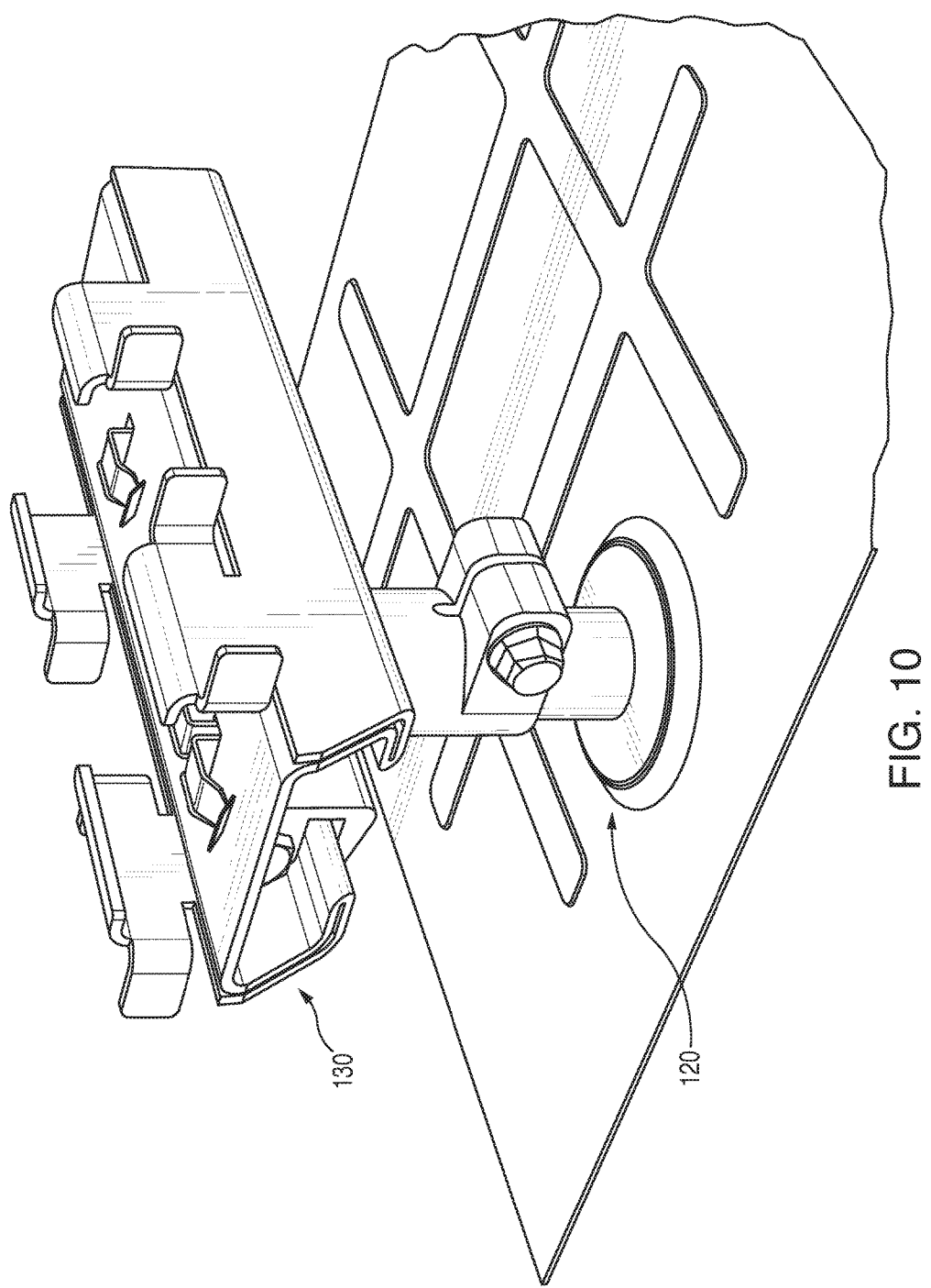

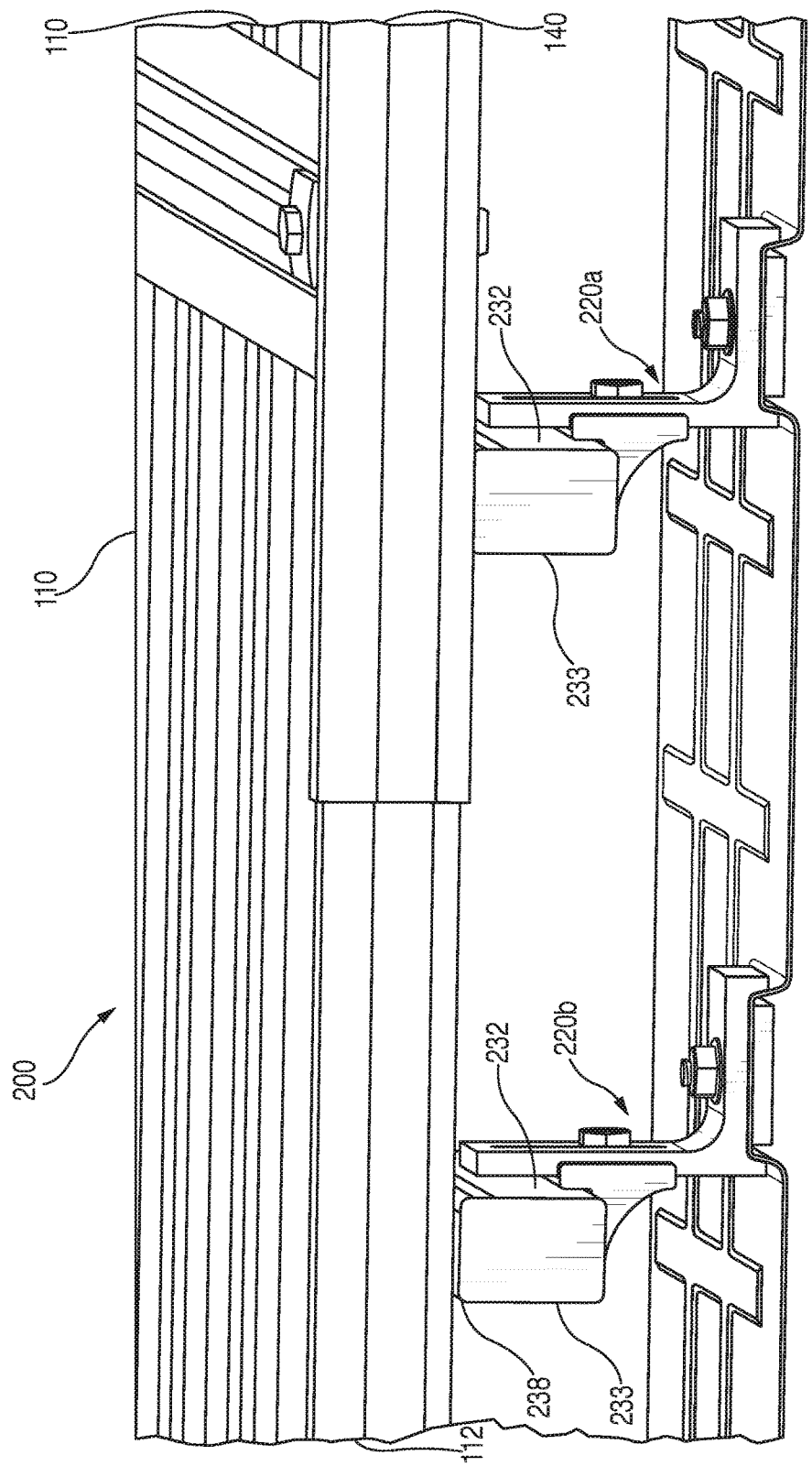

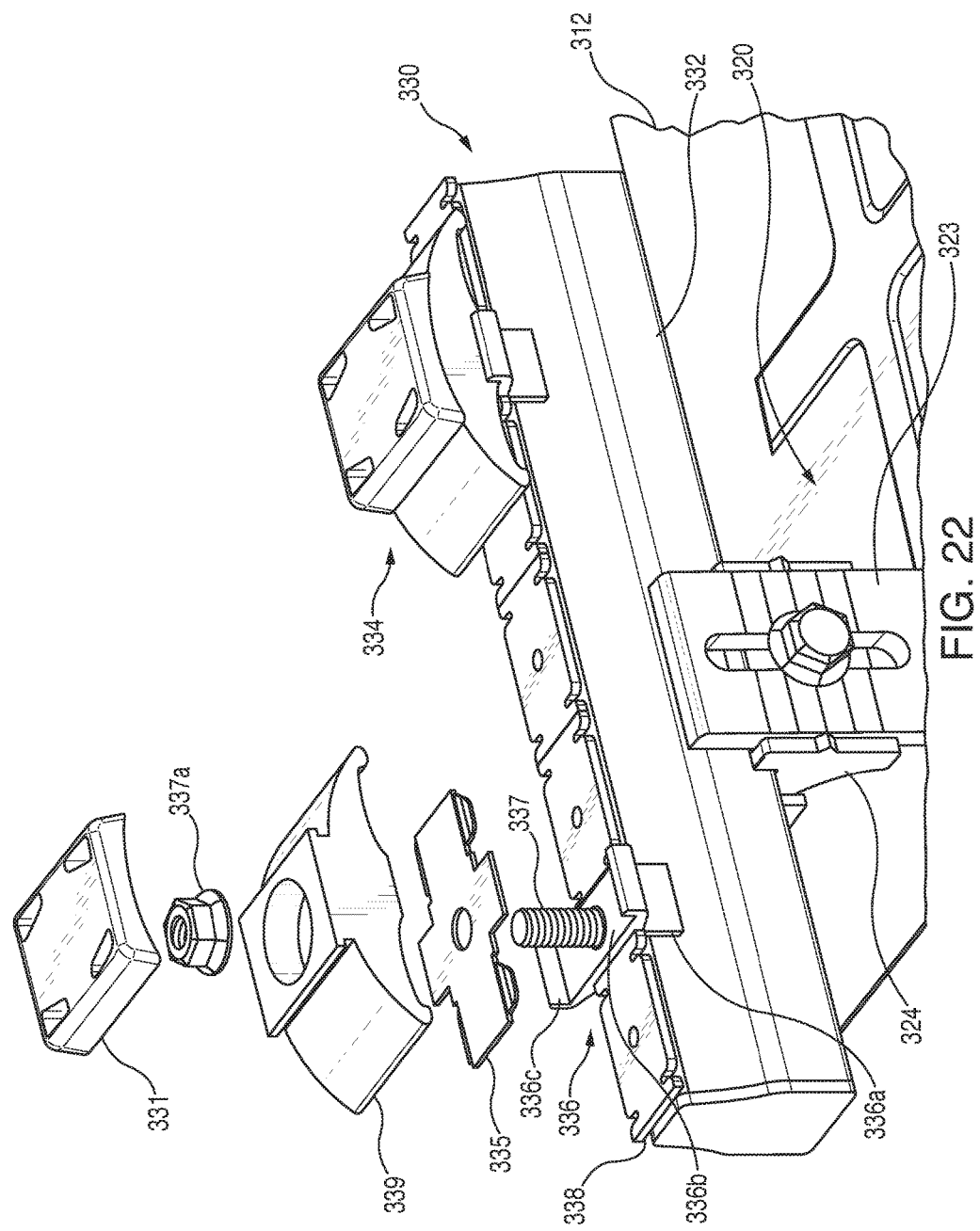

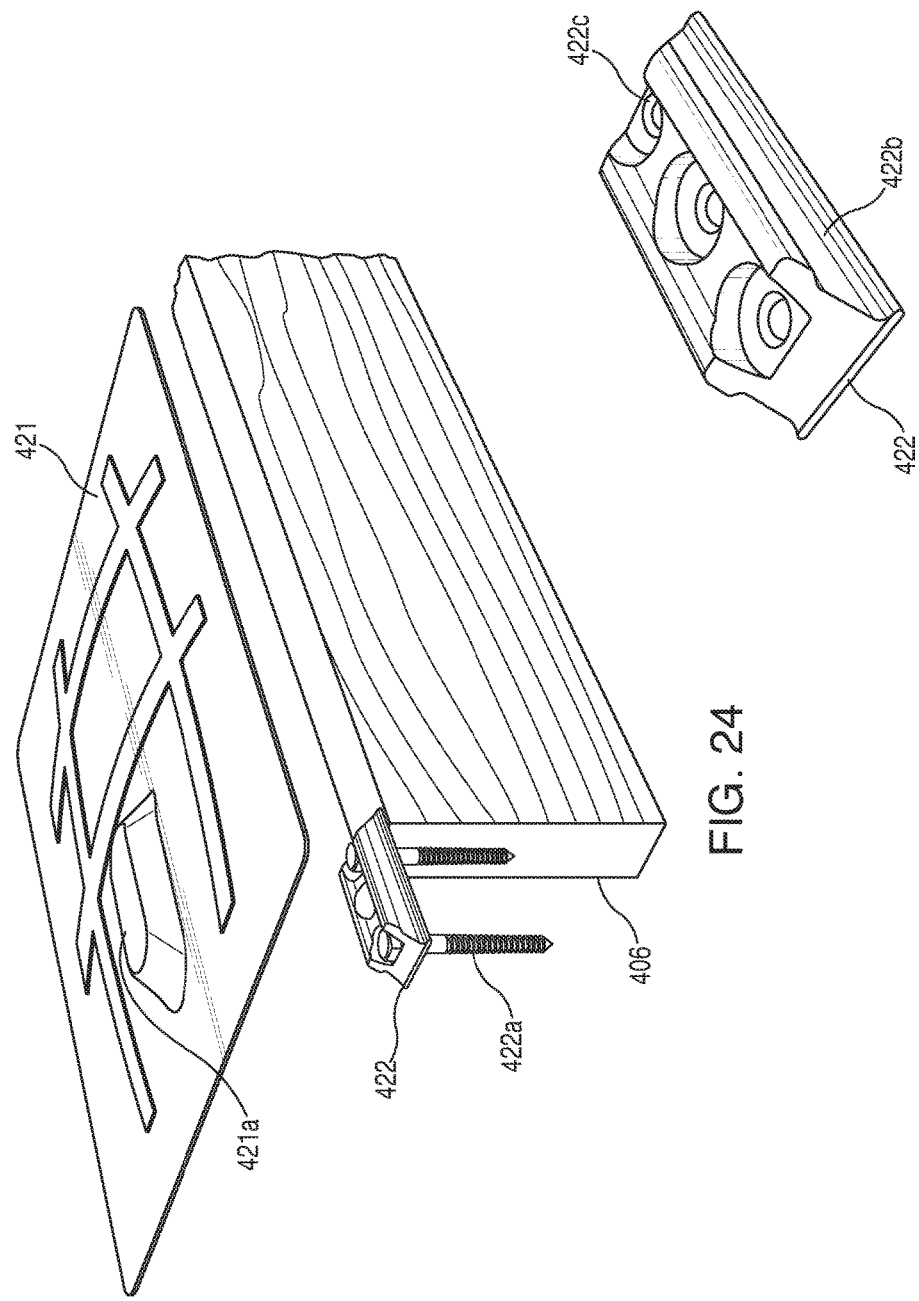

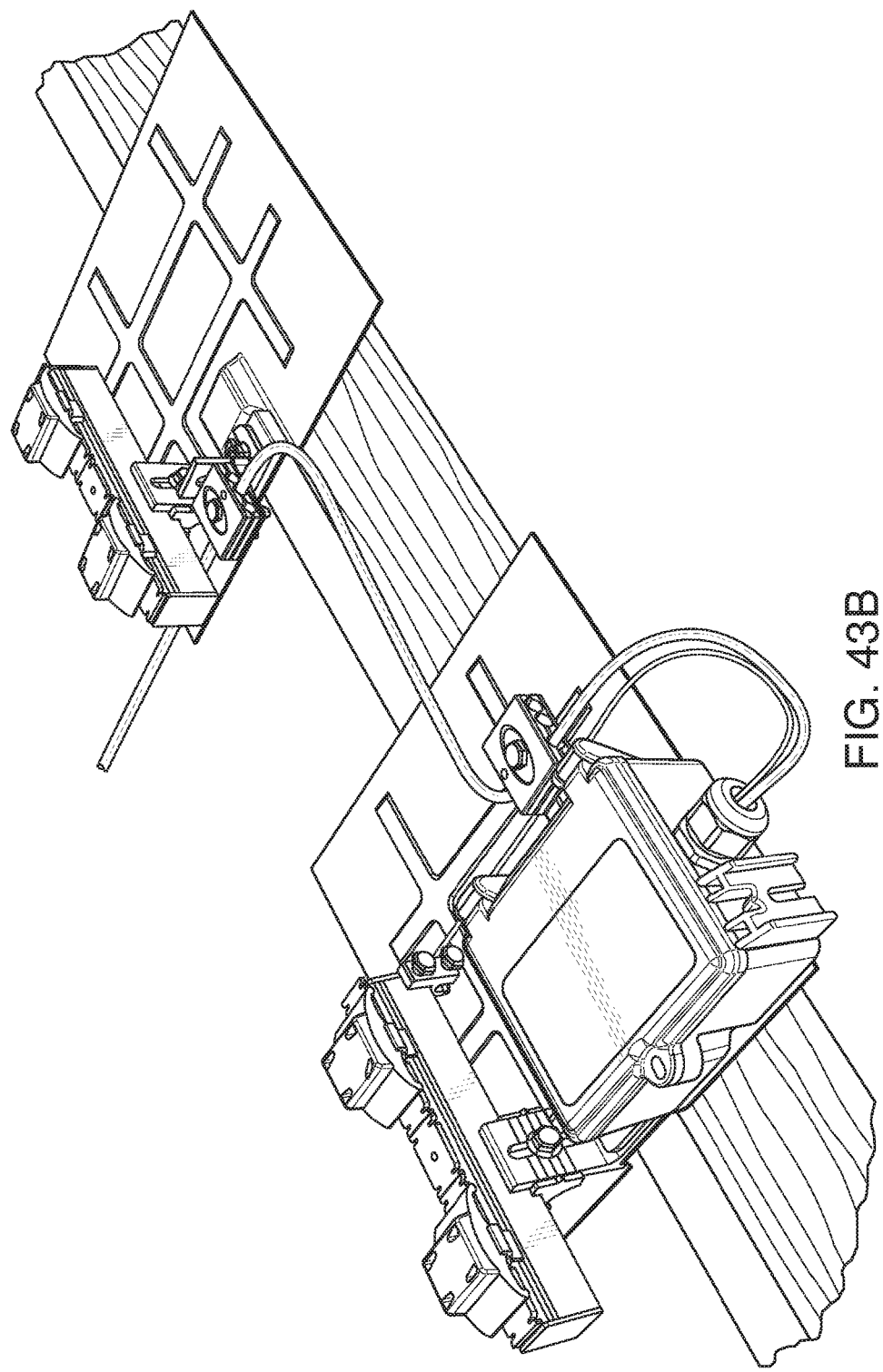

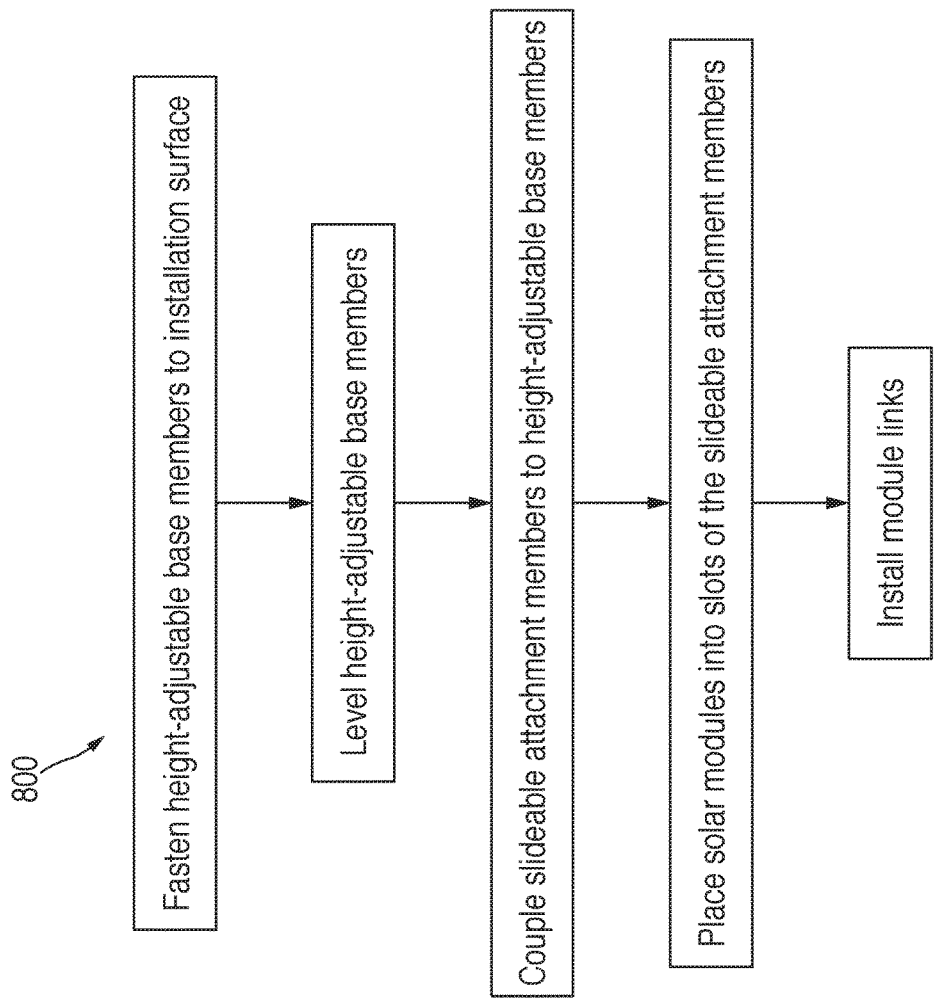

SOLAR PANEL INSTALLATION SYSTEMS AND METHODS

CROSS-REFERENCE TO RELATED APPLICATIONS

This application claims the benefit of U.S. Provisional Patent Application Ser. No. 62/033,311, entitled "Solar Panel Installation Systems and Methods," filed Aug. 5, 2014, the disclosure of which is incorporated by reference herein in its entirety; U.S. Provisional Patent Application Ser. No. 62/075,607, entitled "SOLAR PANEL INSTALLATION SYSTEMS AND METHODS," filed Nov. 5, 2014, the disclosure of which is incorporated by reference herein in its entirety; U.S. Provisional Patent Application Ser. No. 62/138,065, entitled "TILED ROOF MOUNTING SYSTEMS," filed Mar. 25, 2015, the disclosure of which is incorporated by reference herein in its entirety; and U.S. Provisional Patent Application Ser. No. 62/187,995, entitled SOLAR PANEL INSTALLATION SYSTEMS AND METHODS," filed Jul. 2, 2015, the disclosure of which is incorporated by reference herein in its entirety. This application is related to U.S. patent application Ser. No. 14/819,398, filed Aug. 5, 2015, the disclosure of which is incorporated by reference herein in its entirety, and U.S. Pat. No. 9,813,013, issued on Nov. 7, 2017, the disclosure of which is incorporated by reference herein in its entirety.

BACKGROUND OF THE INVENTION

Solar panel installations typically require framed solar panels, or modules, mounted on complex base structures assembled from posts, rails, clamps, and other fasteners. A significant portion of the cost of these solar panel installations may be attributed to the rails, which are often very long extruded or roll-formed members. Aside from the cost of manufacturing the rails, their considerable length can add to the cost of shipping materials to the installation site and add difficulty to the installation process. Accordingly, railless solar panel installation systems could beneficially reduce the costs of manufacturing, shipping, and installing solar panels.

SUMMARY OF THE DISCLOSURE

The solar panel installation systems disclosed herein may include an array of solar modules suspended above an installation surface using a number of height-adjustable base members. The height-adjustable base members may be attached to the installation surface and used to support the solar modules at desired levels above the installation surface.

A height-adjustable base member may include a leveling mechanism coupled to a base plate that may be affixed to the installation surface with one or more fasteners. A slidable attachment member configured to engage a lip of a solar module may be physically coupled to the top of the leveling mechanism to attach the solar modules to the height-adjustable base member.

Adjacent solar modules may be attached to one another at or near their corners using module links, thereby transforming the individual module frames into a system-wide structural members that help spread local loads throughout the system thereby reducing or eliminating the need for separate mounting rails. The module links may be attached to two or more solar modules and secured in place using mid clamps clamped between adjacent solar modules.

BRIEF DESCRIPTION OF THE DRAWINGS

For a fuller understanding of the inventive embodiments, reference is made to the following description taken in connection with the accompanying drawings in which:

FIG. 1 shows a schematic top plan view of a solar panel installation system, in accordance with various embodiments;

FIG. 10 shows a perspective view of a slidable attachment member mounted on a height-adjustable base member, in accordance with various embodiments;

FIG. 19A shows a perspective view of a portion of a solar panel installation system, in accordance with some embodiments;

FIG. 22 shows a partially exploded perspective view of a height-adjustable base member coupled to a slidable attachment member, in accordance with some embodiments;

FIG. 24 shows an exploded view of a portion of a height-adjustable base member, in accordance with various embodiments;

FIG. 25 shows a detailed perspective view of an L-foot base, in accordance with various embodiments;

FIGS. 43A-43C show perspective views of wires routed in a wide range of directions with respect to an L-foot, in accordance with various embodiments; and FIG. 44 shows a flowchart of an exemplary process 400 for assembling a solar panel installation, in accordance with some embodiments.

DETAILED DESCRIPTION OF THE PREFERRED EMBODIMENTS

Figure 2A:
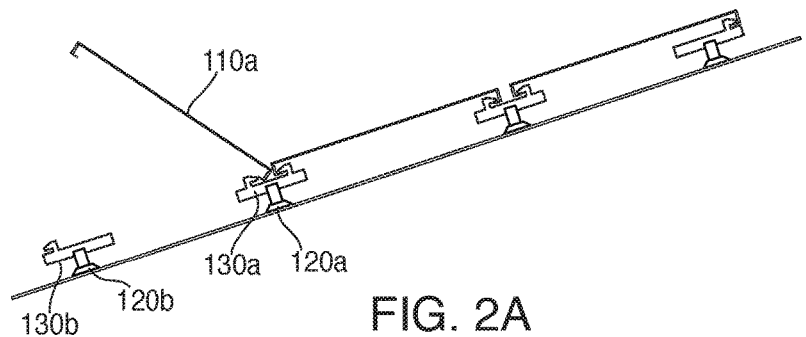
FIGS. 2A-2C show schematic cross-sectional views of a solar panel installation system, including several solar modules being mounted to an installation surface using height-adjustable base members and slidable attachment members, in accordance with various embodiments.

FIG. 1 shows a schematic top plan view of solar panel installation system 100, in accordance with various embodiments. System 100 may include an array of solar modules 110 mounted above installation surface 104 using a number of height-adjustable base members 120. Adjacent solar modules may be coupled together at or near their corners using module links 140.

Solar modules 110 may each include an array of electricity-generating solar cells covered with a protectant material, such as tempered glass or a laminate material, for example. The array of solar cells may be supported underneath and enclosed about the perimeter with a frame. Solar modules 110 are typically rectangular-shaped structures having four corners but other shapes are possible and explicitly contemplated for use with the embodiments disclosed herein.

Solar modules 110 may be supported above installation surface 104, which may be a roof or the ground, for example, using height-adjustable base members 120. Height-adjustable base members 120 can attach to the frames of solar modules 110 at locations along their edges. Depending on environmental and regulatory requirements, a suitable number of height-adjustable base members 120 can be provided along each edge of each solar module 110. For example, a single height-adjustable base member 120 may be provided along each long edge of solar modules 110 with zero members being provided along each short edge, as shown in FIG. 1. In another example, two height-adjustable base members 120 may be provided along each long edge of solar modules 110 with one member being provided along each short edge.

Height-adjustable base members 120 may be height-adjustable in order to level the array of solar modules 110, taking into account irregularities in installation surface 104 and/or in the frames of solar modules 110. In some embodiments, height-adjustable base members 120 may also provide a tilt for the array of solar modules 110 to increase their exposure to sunlight. Height-adjustable base members 120 may also be physically coupled to installation surface 104. In some embodiments, height-adjustable base members 120 may be secured to structural members of installation surface 104, such as roof rafters 106, for example.

As depicted in FIG. 1, solar modules 110 may be arranged in a grid-shaped array with each corner solar module being edgewise adjacent to two other solar modules and diagonally adjacent to one other solar module, each non-corner edge solar module being edgewise adjacent to three other solar modules and diagonally adjacent to two other solar modules, and each interior solar module being edgewise adjacent to four other solar modules and diagonally adjacent to four other solar modules. Locations in the array where the corners of solar modules 110 are closest to one another in the array may be referred to herein as intersections.

Solar modules 110 may be attached to one another at or near their corners using module links 140. Module links 140 may attach to the frames of solar modules 110 to provide structural coupling between the any two edgewise adjacent solar modules 110 or all four adjacent solar modules at each interior intersection and between two edgewise adjacent solar modules 110 at each edge intersection. Coupling solar modules 110 together in this manner can transform the array of independent solar modules 110 into a single structural member that advantageously spreads loads throughout system 100, thereby reducing or eliminating the need for long, expensive mounting rails.

Figure 2B:
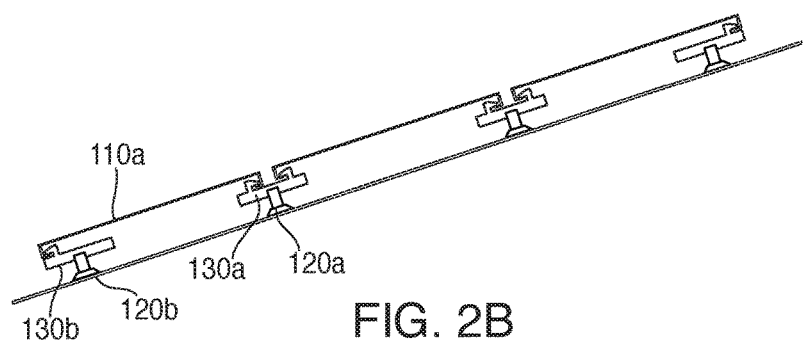
Figure 2C:
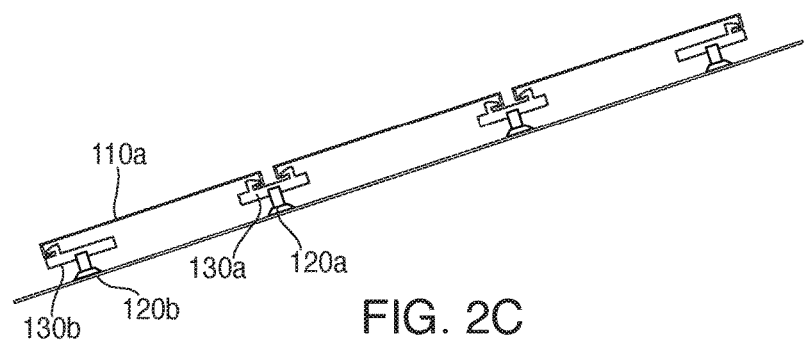

FIGS. 2A-2C show schematic cross-sectional views of system 100, including several solar modules 110 being mounted to installation surface 104 using height-adjustable base members 120 and slidable attachment members 130, in accordance with various embodiments. In particular, FIGS. 2A-2C depict a typical installation progression for system 100 in which a solar module (i.e., solar module 110a) is brought into engagement with a first slidable attachment member 130a mounted above height-adjustable base member 120a, rotated down toward a second slidable attachment member 130b mounted above height-adjustable base member 120b, and the solar module being locked into place by virtue of at least one component of slidable attachment member 130 retaining the frame of module 110a. All modules in the array can be installed using the same general procedure.

It should be understood that while FIGS. 2A-2C depict height-adjustable base member 120 and slidable attachment member 130, the same basic installation method and module array configuration depicted here is applicable to the various height-adjustable base member and slidable attachment member embodiments disclosed herein. Furthermore, although certain height-adjustable base members and slidable attachment members are depicted and described in conjunction in the following descriptions and drawings, one of skill in the art will appreciate that in some embodiments, the height-adjustable base members and slidable attachment members can be interchanged (e.g., height-adjustable base member 220 can support slidable attachment member 330, height-adjustable base member 420 can support slidable attachment member 230, etc.).

Figure 3:
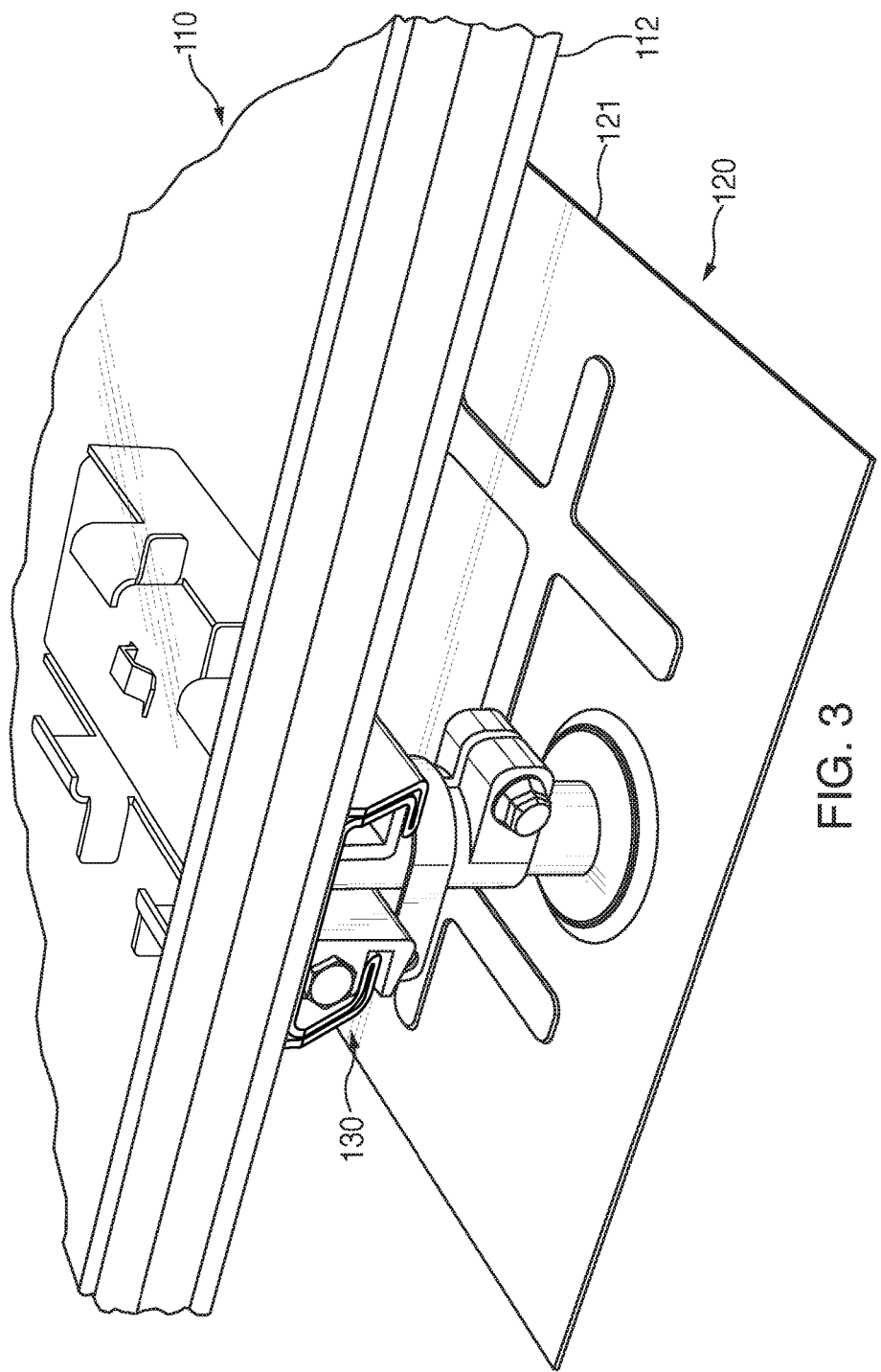
FIG. 3 shows a perspective view of a solar module supported by a height-adjustable base member, in accordance with various embodiments.

FIG. 3 shows a perspective view of solar module 110 supported by height-adjustable base member 120, in accordance with various embodiments. Height-adjustable base member 120 may include height-adjustable support mechanism 126 (shown in FIG. 5) extending away from base plate 121, which may be placed on and physically coupled to an installation surface (e.g., installation surface 104 of FIG. 1) as described in detail below. Height-adjustable support mechanism 126 may be shaped to slidably receive slidable attachment member 130, which may, in turn, slidably receive a portion (e.g., a flange) of frame 112 of solar module 110. Accordingly, height-adjustable base member 120 can support an edge of solar module 110 above the installation surface in a height-adjustable manner.

Because slidable attachment member 130 travels with respect to height-adjustable base member 120, it provides tolerance to adjust the point where slidable attachment member 130 attaches to frame 112. In particular, for the rail-less installations disclosed here, it may not be possible to determine in advance where a module frame will land relative to the roofing "courses" or rows of shingles. On composition roofs, for example, it is common for courses to be separated by approximately 5 inches (12.7 cm), so slidable attachment members having approximately 6 inches (15.2 cm) of travel in either direction can provide the required tolerance. On tile roofs, shingles tend to repeat approximately every 13 inches (33 cm). For this reason, a tile base plate can be provided with ribs stamped into the flashing. Because the height-adjustable base member may be installed at any point along the rib, these ribs allow the slidable attachment member more travel (e.g., approximately 6 inches (15.2 cm)) for the height-adjustable base members, thereby allowing them to cover the range of locations that may be required of them without limiting the allowable positions for solar module placement. Tile replacement embodiments are disclosed below with respect to FIGS. 38-41.

Figure 4:
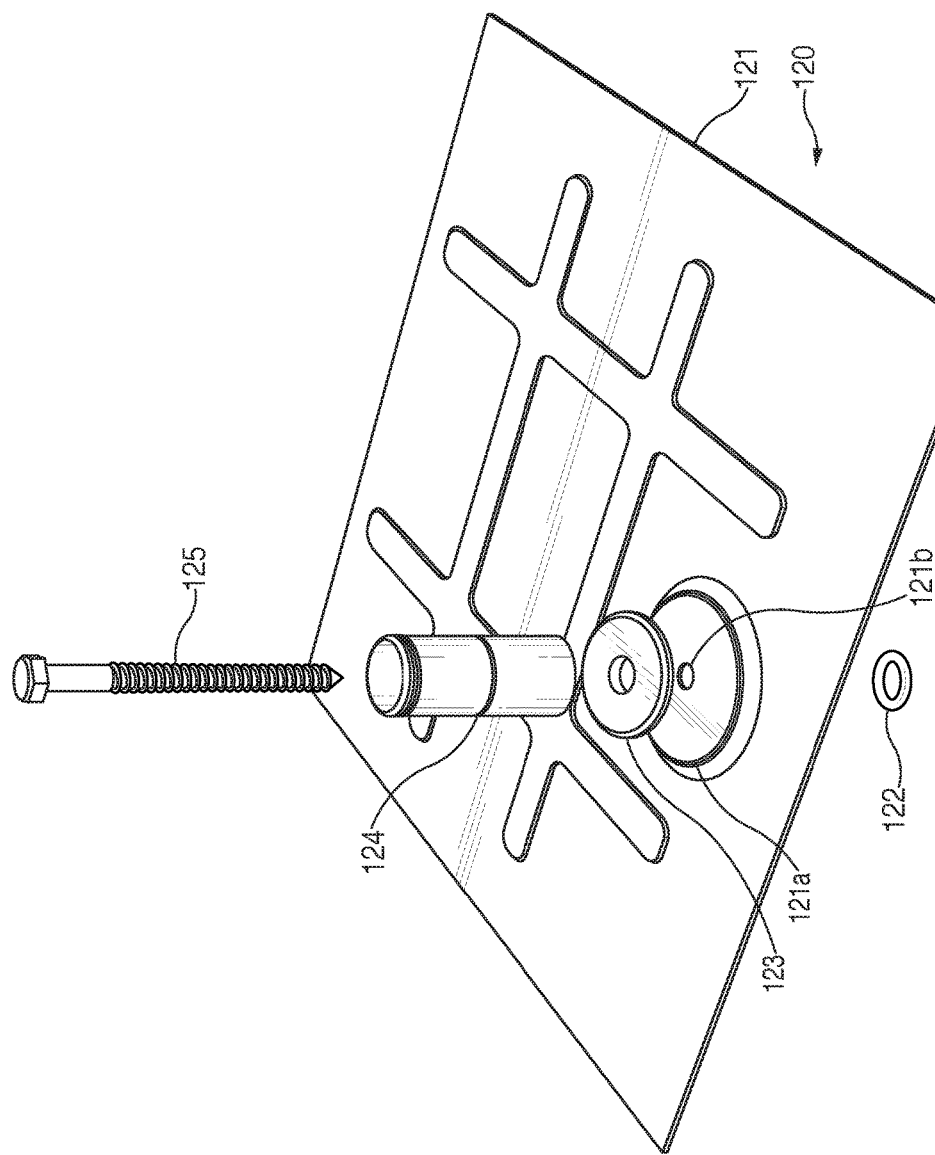
FIG. 4 shows an exploded view of a portion of a height-adjustable base member, in accordance with various embodiments.

FIG. 4 shows an exploded view of a portion of height-adjustable base member 120, in accordance with various embodiments, including base plate 121, with raised portion 121a and aperture 121b formed in raised portion 121a, o-ring 122, washer 123, post 124, and fastener 125. O-ring 122 may be a compressible gasket that can be placed underneath base plate 121 between raised portion 121a and the installation surface. O-ring 122 can include an aperture coincident with aperture 121b of base plate 121 to receive fastener 125. O-ring 122 may thereby seal height-adjustable base member 120 in a water-tight manner to prevent moisture from reaching the installation surface under base plate 121.

Post 124 may extend substantially perpendicularly away from base plate 121 in a direction opposing the installation surface. Post 124 can be a hollow cylindrically-shaped member that can receive fastener 125, which may be any suitable fastener, such as a nail, a screw, or a lag bolt, in accordance with various embodiments. Fastener 125 can extend through an aperture with a smaller diameter than the outer diameter of post 124 in order to secure post 124 to base plate 121 and base plate 121 to the installation surface. Washer 123 may be provided between the aperture of post 124 and the aperture 121b of raised portion 121a, and may be a traditional washer or a sealing-gasket in accordance with various embodiments.

Figure 5:
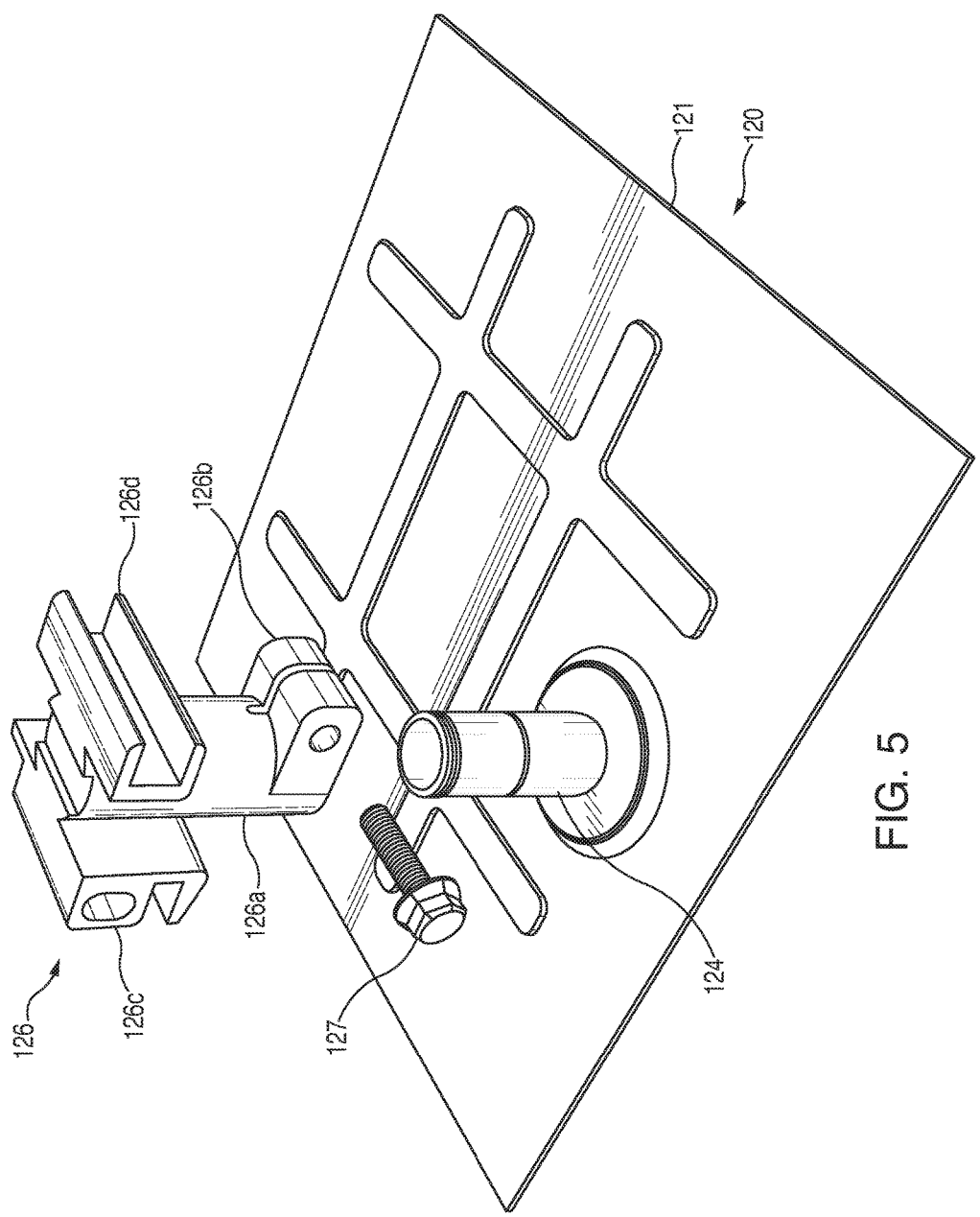
FIG. 5 shows an exploded view of a height-adjustable base member, in accordance with various embodiments.

FIG. 5 shows an exploded view of height-adjustable base member 120, in accordance with various embodiments. In particular, FIG. 5 shows height-adjustable support mechanism 126 ready to be mounted on the portion of height-adjustable base member 120 shown in FIG. 4, now assembled. Height-adjustable support mechanism 126 may include hollow cylindrically-shaped member 126a, which may be configured to concentrically receive post 124 such that height-adjustable support mechanism 126 can be slid longitudinally along the length of post 124. Height-adjustable support mechanism 126 may include a longitudinal split running part of its length. The slit may be part of clamping mechanism 126b, having two flanges extending substantially perpendicularly away from hollow cylindrically-shaped member 126a, with one flange positioned on each side of the slit. Each flange may also include an aperture configured to receive fastener 127. In some embodiments, one or both of the apertures may be threaded and configured to threadably receive a threaded fastener 127

Tightening fastener 127 within the apertures can cause the flanges to approach one another, thereby reducing the width of the slit and the circumference of hollow cylindrically-shaped member 126a. Using clamping mechanism 126b, the circumference of hollow cylindrically-shaped member 126a may be reduced to a size that approaches the outer circumference of post 124, thus clamping height-adjustable support mechanism 126 to a desired position on post 124. In some embodiments, the exterior surface of post 124 and the interior surface of hollow cylindrically-shaped member 126a may be provided with ridges that can promote engagement therebetween and resist relative motion when height-adjustable support mechanism 126 is in clamped engagement with post 124.

Height-adjustable support mechanism 126 may further include features for receiving and locking in place slidable attachment member 130. For example, locking member 126c may be configured to slidably engage slidable attachment member 130 such that slidable attachment member 130 may move in substantially one dimension with respect to height-adjustable support mechanism 126. Locking member 126c may include an aperture formed through a fastener receiving surface and a sloped surface extending obliquely from a top surface of locking member 126c toward the fastener receiving surface, where the aperture is configured to receive a fastener that further restricts relative movement of slidable attachment member 130 in its otherwise free dimension.

Sliding member 126d, situated on an opposing side of hollow cylindrically-shaped member 126a, may be similar to locking member 126c with the exception of the aperture. In some embodiments, however, sliding member 126d may be configured as a second locking member.

Figure 6:
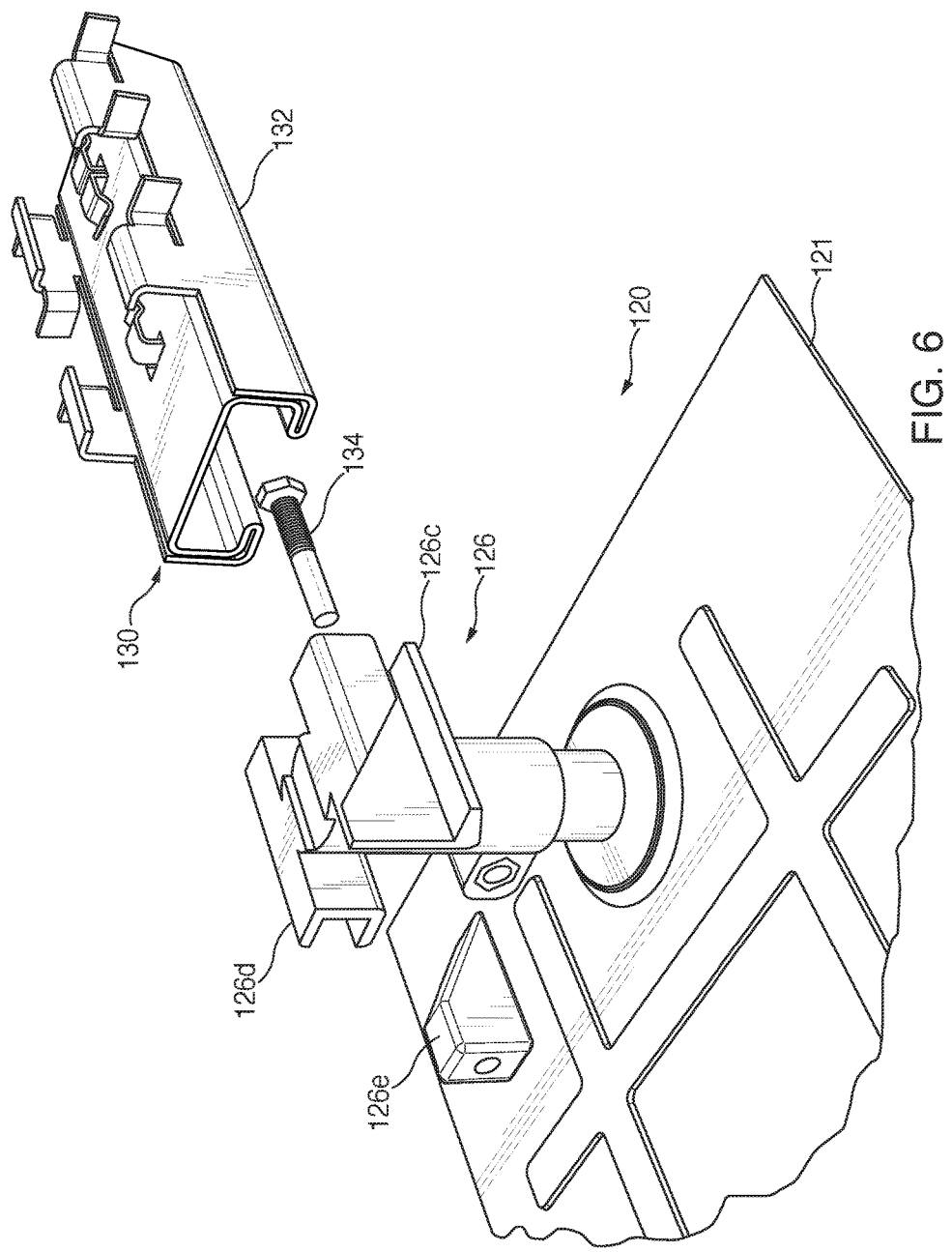
FIG. 6 shows an exploded view of a height-adjustable base member and slidable attachment member, in accordance with various embodiments.

FIG. 6 shows an exploded view of height-adjustable base member 120 and slidable attachment member 130, in accordance with various embodiments. In particular, FIG. 6 shows height-adjustable base member 120 fully assembled and ready to receive slidable attachment member 130.

Slidable attachment member 130 can include C-shaped sliding portion 132 configured to slidably couple to locking member 126c and sliding member 126d of height-adjustable support mechanism 126. The walls and flanges of C-shaped sliding portion 132 permit slidable engagement between slidable attachment member 130 and height-adjustable base member 120 in substantially only one direction. Fastener 134 may be inserted the aperture of locking member 126c and into a threaded aperture formed in wedge 126e in order to secure slidable attachment member 130 to height-adjustable base member 120 by preventing relative movement between the two components in the otherwise free dimension. In particular, a sloped surface of wedge 126e, can be brought into engagement with the complementary sloped surface of locking member 126c. When fastener 134 is tightened in the threaded aperture of wedge 126e, wedge 126e slides against locking member 126c in a direction towards the installation surface. In this way, wedge 126e can clamp down on an end of C-shaped sliding portion 132 to lock slidable adjustment member 130 in place relative to height-adjustable base member 120.

Figure 7:
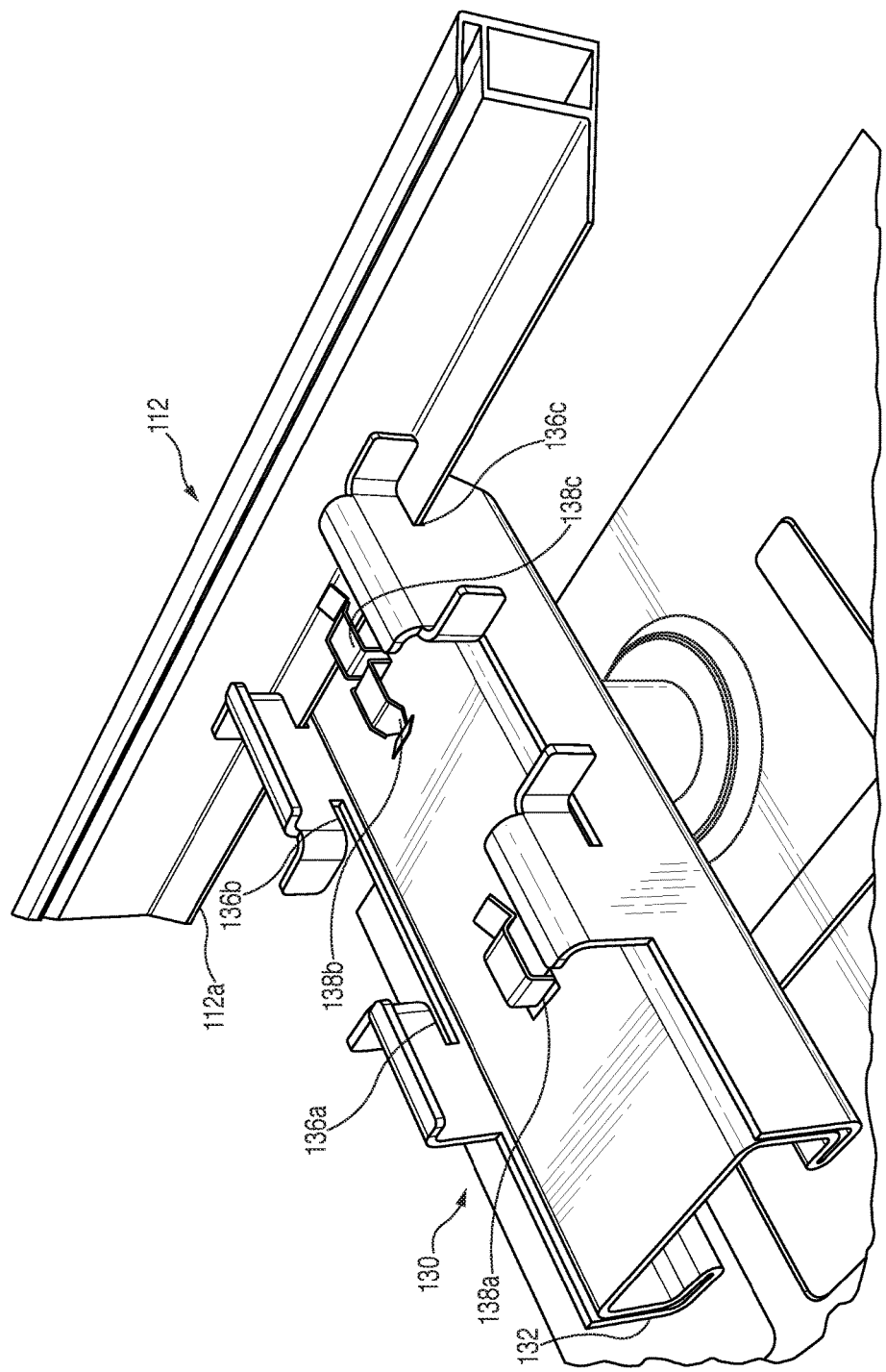
FIG. 7 shows a detailed perspective view of a slidable attachment member, in accordance with various embodiments.

FIG. 7 shows a detailed perspective view of slidable attachment member 130, in accordance with various embodiments. In particular, FIG. 7 shows frame-engagement slots 136a-c and clips 138a-c, which may be configured to receive a flange of a solar module frame, such as flange 112a of frame 112. Each slot/clip combination (e.g., slot 136a and clip 138a) can receive and retain a flange of a solar module frame, thereby attaching the frame to height-adjustable base member 120 and the installation surface.

Slidable attachment member 130 can attach solar modules 110 to height-adjustable base members 120 at both interior and exterior positions in system 100. As depicted in FIG. 6, slot 136c and clip 138c may be configured to retain frame 112 positioned on the perimeter of the array of solar modules 110 of FIG. 1). Slots 136a and 136b and clips 138a and 138b, on the other hand, may be used to retain the frames of two edgewise adjacent solar modules 110 located in the interior of the array. Advantageously, this means that slidable attachment member 130 may be of identical construction regardless of its position in the array.

In some embodiments, slidable attachment member 130 may be a punched and roll-formed member. That is, slidable attachment member 130 may be formed from a single piece of sheet metal that is stamped and then bent and folded to form both C-shaped sliding portion 132 and slots 136a-136c. Clips 138a-138c may also be stamped and bent into shape from the original piece of sheet metal or they may be formed separately and attached in a separate post-processing step.

Figure 8:
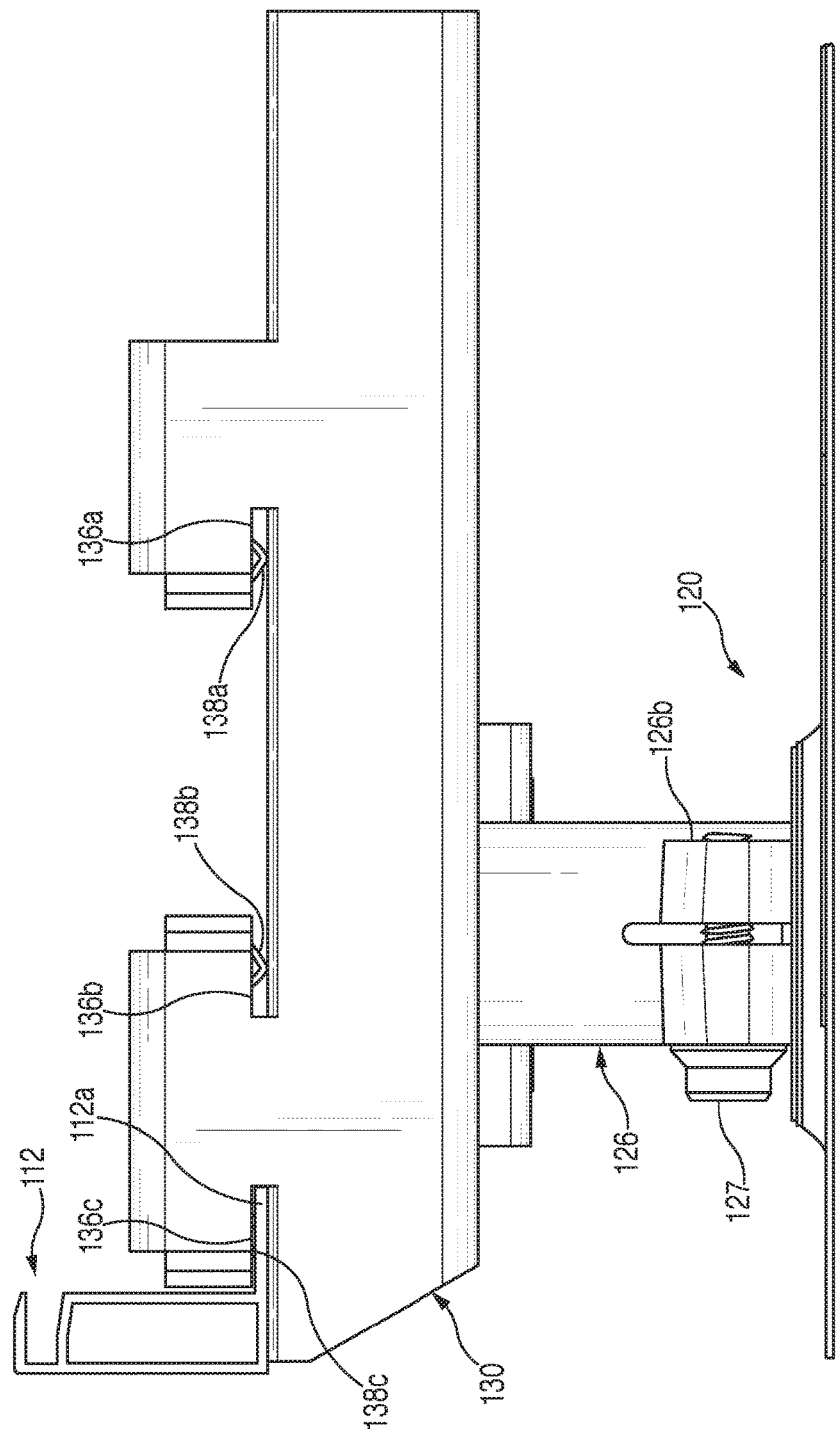
FIG. 8 shows a side elevation view of a frame retained within a slot of a slidable attachment member, in accordance with various embodiments.
Figure 9:
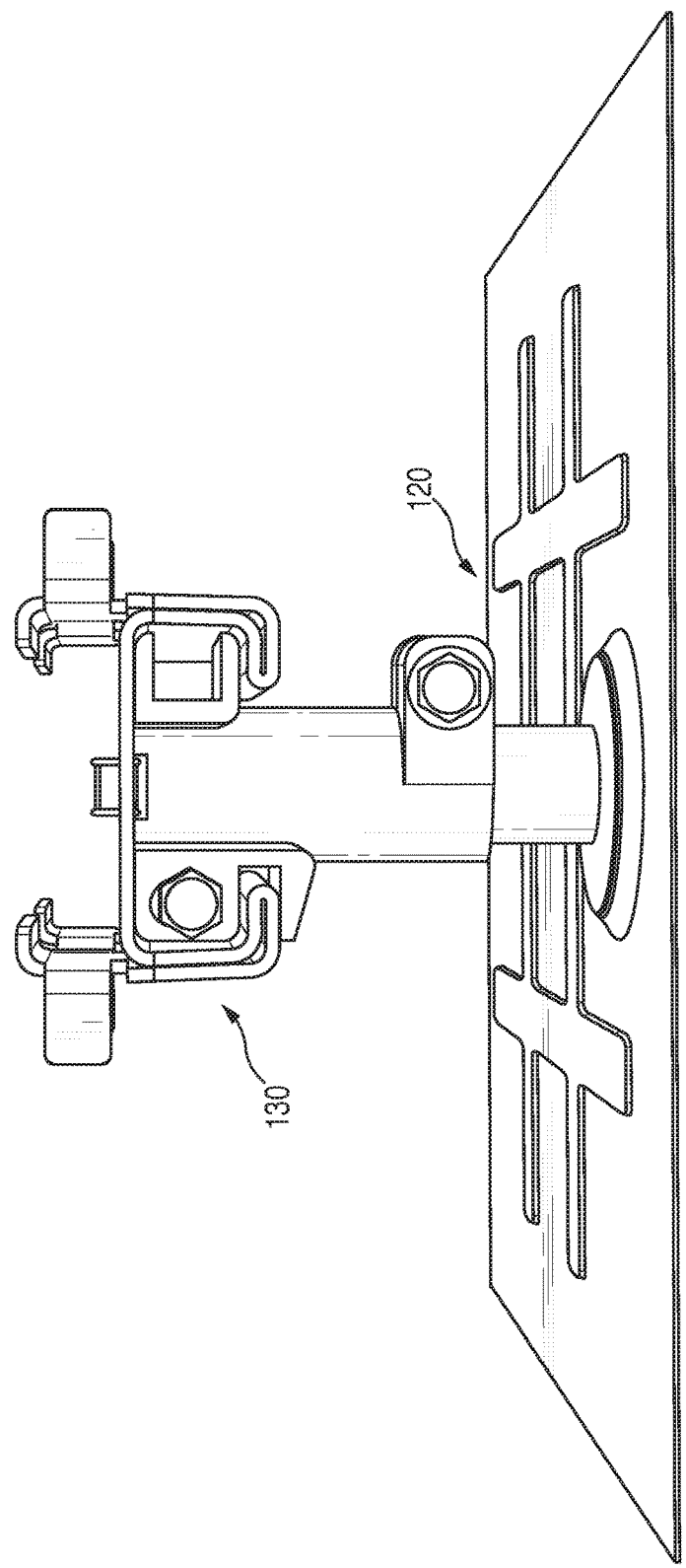
FIG. 9 shows a side front elevation view of a slidable attachment member mounted on a height-adjustable base member, in accordance with various embodiments.

FIG. 8 shows a side elevation view of frame 112 retained within slot 136c of slidable attachment member 130, in accordance with various embodiments. Also visible in this side elevation view is slidable attachment member 130 mounted on height-adjustable base member 120. FIG. 9 shows a side front elevation view of slidable attachment member 130 mounted on height-adjustable base member 120, in accordance with various embodiments. FIG. 10 shows a perspective view of slidable attachment member 130 mounted on height-adjustable base member 120, in accordance with various embodiments.

Figure 11A:
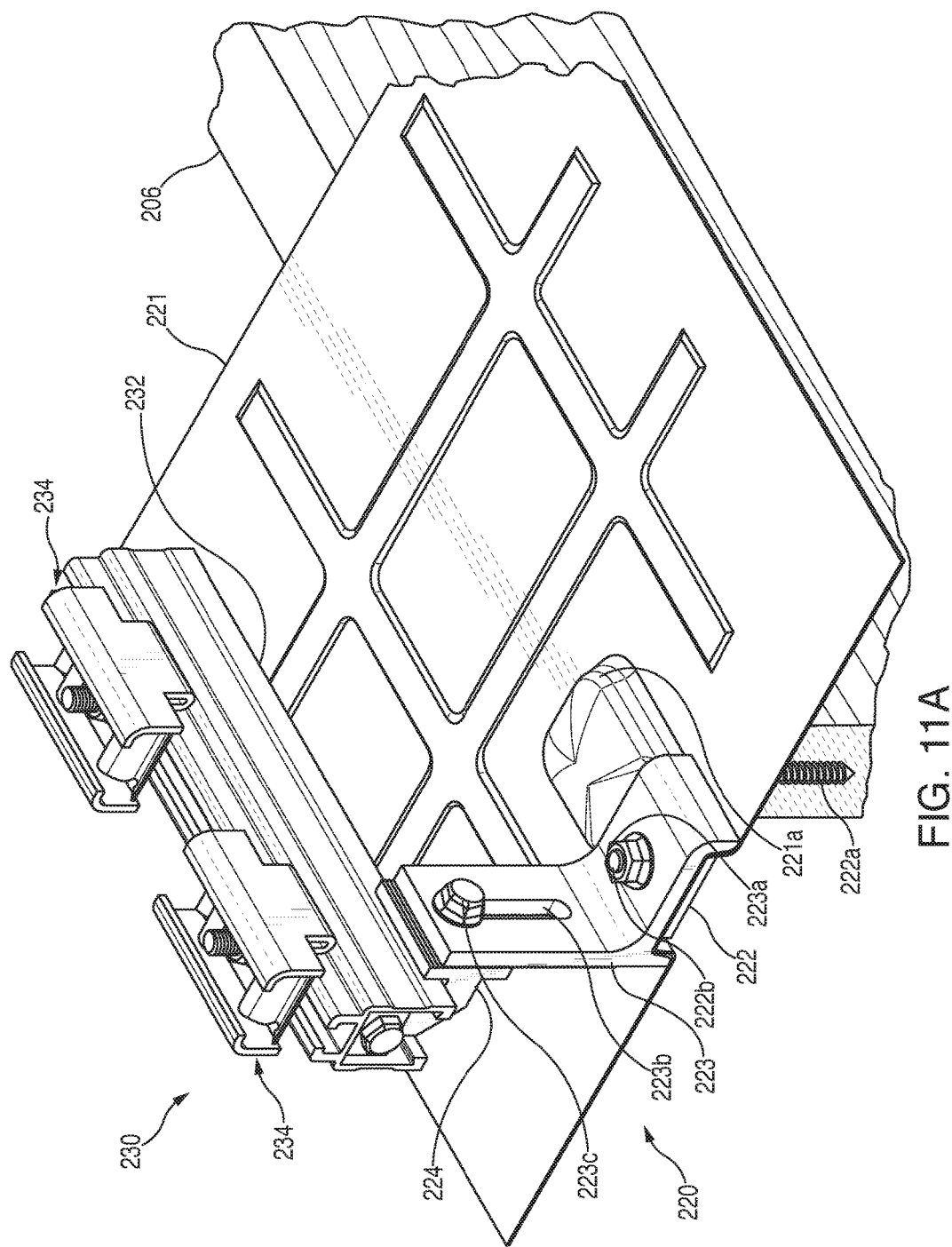
FIG. 11A shows a perspective view of a height-adjustable base member coupled to a slidable attachment member, in accordance with various embodiments.

FIG. 11A shows a perspective view of height-adjustable base member 220 coupled to slidable attachment member 230, in accordance with various embodiments. Height-adjustable base member 220 may be functionally similar to height-adjustable base member 120, so it can provide a height-adjustable support for a slidable attachment member. Height-adjustable base member 220 can differ from height-adjustable base member 120, however, in that some or all of its component parts may be extruded rather than stamped and roll-formed.

Height-adjustable base member 220 includes base plate 221, which may include raised-portion 221a arranged over L-foot base 222. L-foot base 222 may be secured to an installation surface or a structural member supporting the installation surface, such as roof rafter 206, for example, using fastener 222a, which can extend through aperture 222c (shown in FIG. 12) formed in L-foot base 222 under a domed section of raised portion 221a. Threaded stud 222b can extend substantially perpendicularly away from L-foot base 222 in a direction opposing the installation surface.

L-foot 223 may be coupled to L-foot base 222 using threaded stud 222b, which may extend through an aperture in the horizontally arranged section of L-foot 223, and nut 223a, which can threadably engage threaded stud 222b. Threaded stud 222b may also extend through an aperture formed in a flat section of raised portion 221a, which may be secured between the horizontally arranged section of L-foot 223 and L-foot base 222, thereby coupling base plate 221 to the installation surface. In some embodiments, the horizontally arranged section of L-foot 223 may be shaped to match the contours of L-foot base 222 and the flat portion of raised section 221a.

The vertically arranged section of L-foot 223 may include longitudinal slit 223b formed along at least a portion of its length. Longitudinal slit 223b may be configured to receive fastener 223c for adjustably coupling arm 224 to a surface of the vertically arranged portion of L-foot 223. The surface of the vertically arranged portion of L-foot 223 and the mating surface of arm 224 may be ribbed or otherwise textured to prevent arm 224 from moving with respect to L-foot 223 when the two components are coupled together with fastener 223c.

Arm 224 may be coupled to and support the weight of slidable attachment member 230. Slidable attachment member 230 can include rail 232 and module retaining assemblies 234 coupled to rail 232. Module retaining assemblies 234 may be used to receive and retain solar module frames as described in more detail below.

Figure 11B:
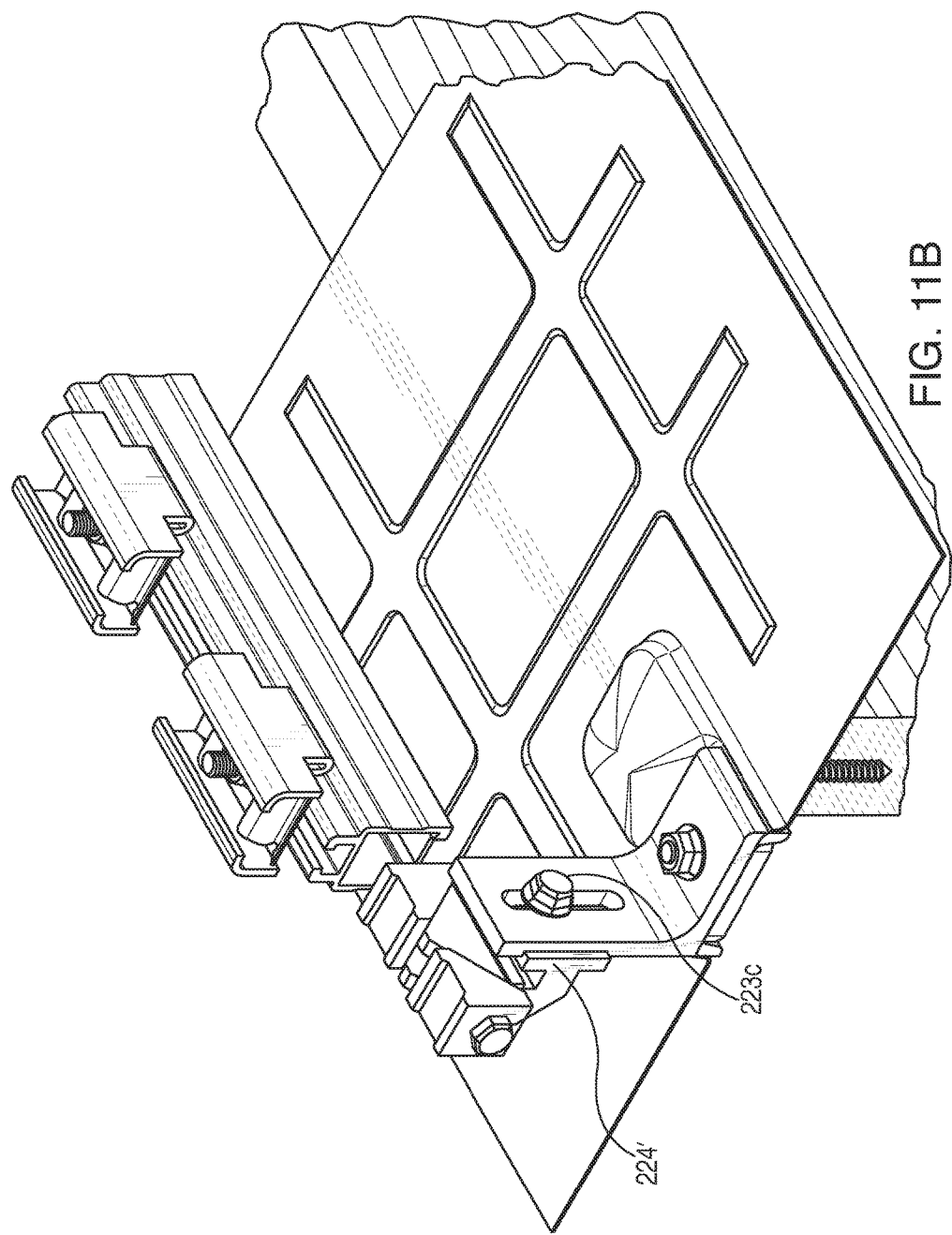
FIG. 11B shows a perspective view of a height-adjustable base member coupled to a slidable attachment member, in accordance with various embodiments.

FIG. 11B shows a perspective view of height-adjustable base member 220 coupled to slidable attachment member 230 as depicted in FIG. 11A with the exception that arm 224' has a mating surface configured to interlock with the surface of the vertical portion of L-foot 223. The interlocking features of arm 224' may wrap partially around the vertical portion of L-foot 223 to prevent arm 224' from twisting while fastener 223c is tightened.

Figure 12:
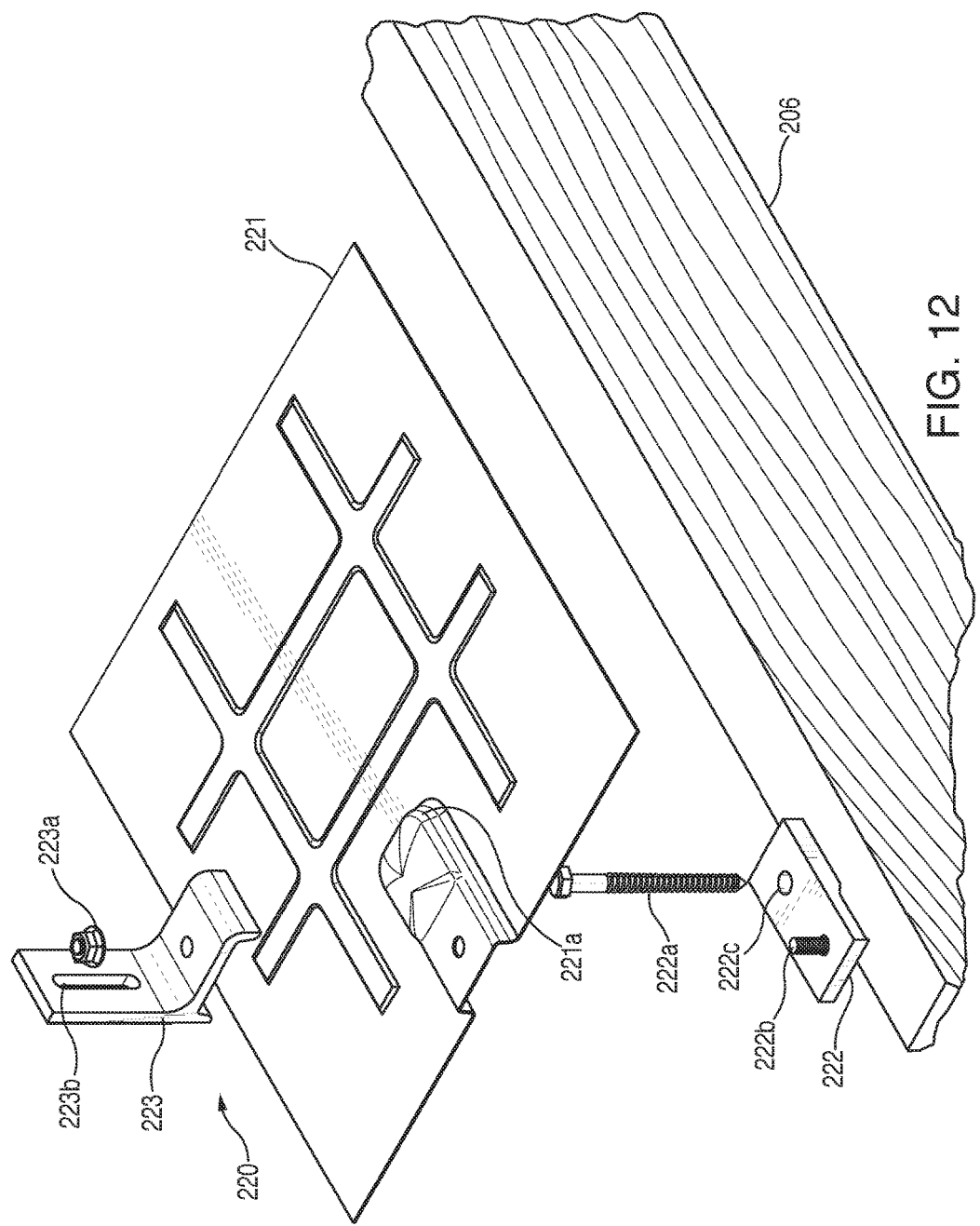
FIG. 12 shows an exploded view of a portion of a height-adjustable base member, in accordance with various embodiments.

FIG. 12 shows an exploded view of a portion of height-adjustable base member 220, in accordance with various embodiments. In particular, FIG. 12 depicts L-foot base 222, including threaded stud 222b, coupleable to roof rafter 206 with fastener 222a. Fastener 222a may be accommodated beneath the domed section of raised portion 221a of base plate 221, and threaded stud 222b may extend through the aperture in the flat section of raised portion 221a. The aperture formed in the horizontally arranged section of L-foot 223 may also receive threaded stud 222b and may be fastened to base plate 221, L-foot base 222, and roof rafter 206 using nut 223a.

Figure 13:
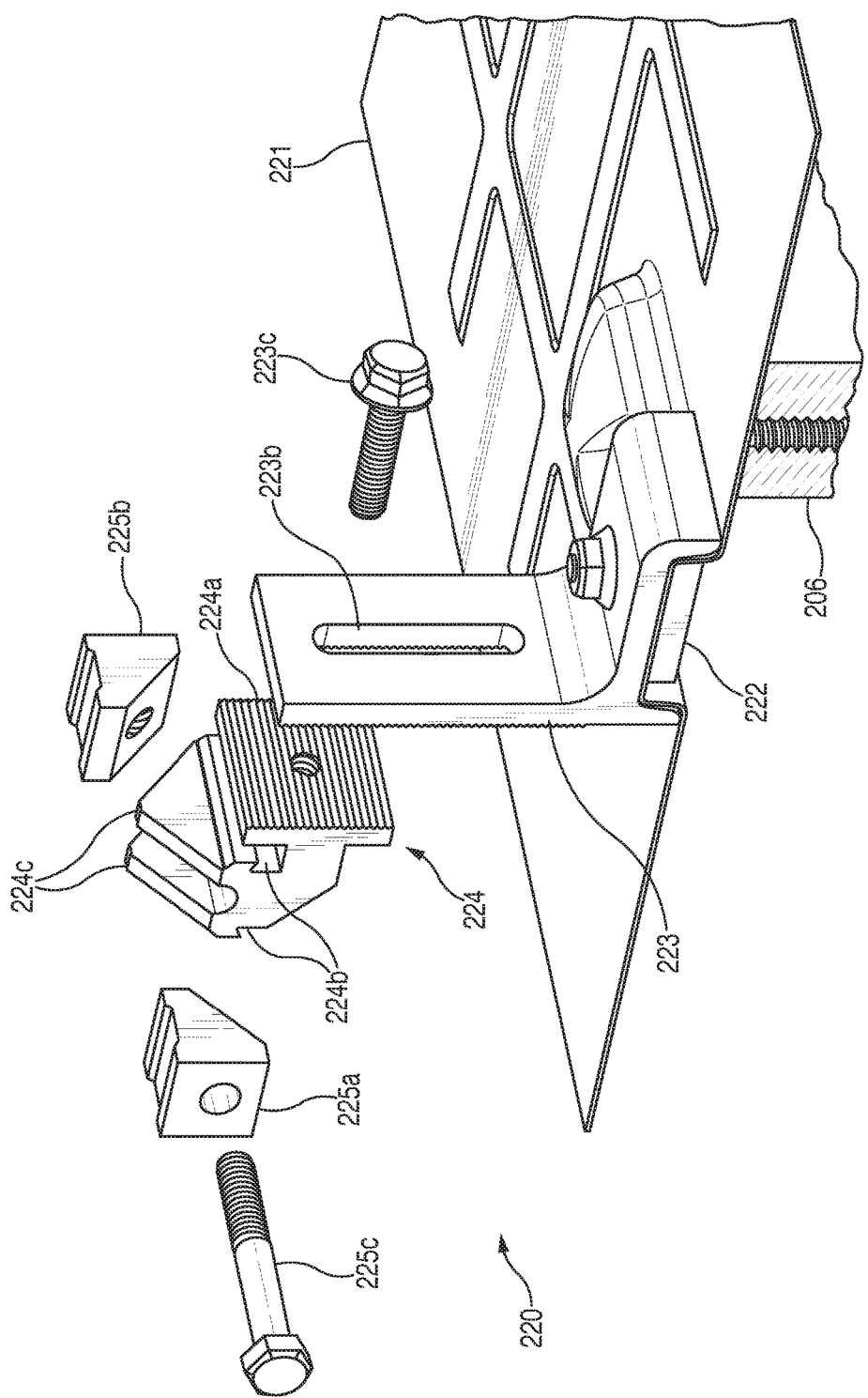
FIG. 13 shows a partially exploded view of a height-adjustable base member, in accordance with various embodiments.

FIG. 13 shows a partially exploded view of height-adjustable base member 220, in accordance with various embodiments. In FIG. 13, it may be appreciated that arm 224 can include mating surface 224a configured to be coupled to a surface of the vertically arranged portion of L-foot 223 with fastener 223c, which may extend through slit 223b and into a threaded bore formed through mating surface 224a. Mating surface 224a and the surface of the vertically arranged portion of L-foot 223 are depicted as having complementarily ribbed surfaces to facilitate slip-free coupling between arm 224 and L-foot 223.

Arm 224 may be generally L-shaped, with mating surface 224a arranged at the end of the horizontally arranged portion of the L. On the vertically arranged portion of the L, arm 224 may include flanges 224b, which can be configured to mate with complementary flanges of rail 232 and disclosed in more detail below. Flanges 224b may be angled towards the installation surface in order to prevent movement of rail 232 in a direction opposing the installation surface.

At the top, distal end of the L, arm 224 may include two sloped surfaces 224c. Wedges 225a and 225b, which may assist in supporting rail 232, can each be placed with a complementarily sloped edge against a respective one of sloped surfaces 224c. Sloped surfaces 224c may be separated from one another by a distance suitable to receive fastener 225c, which can extend through threaded bores in wedges 225a and 225b to couple the wedges together. As fastener 225c is tightened, wedges 225a and 225b may move towards each other, sliding against sloped surfaces and moving together in a direction opposing the installation surface. In some embodiments, only wedge 225b may be provided with a threaded bore, in which case fastener 225c can be inserted first into wedge 225a, without the threaded bore, and then threaded into the threaded bore of the wedge 225b.

Figure 14:
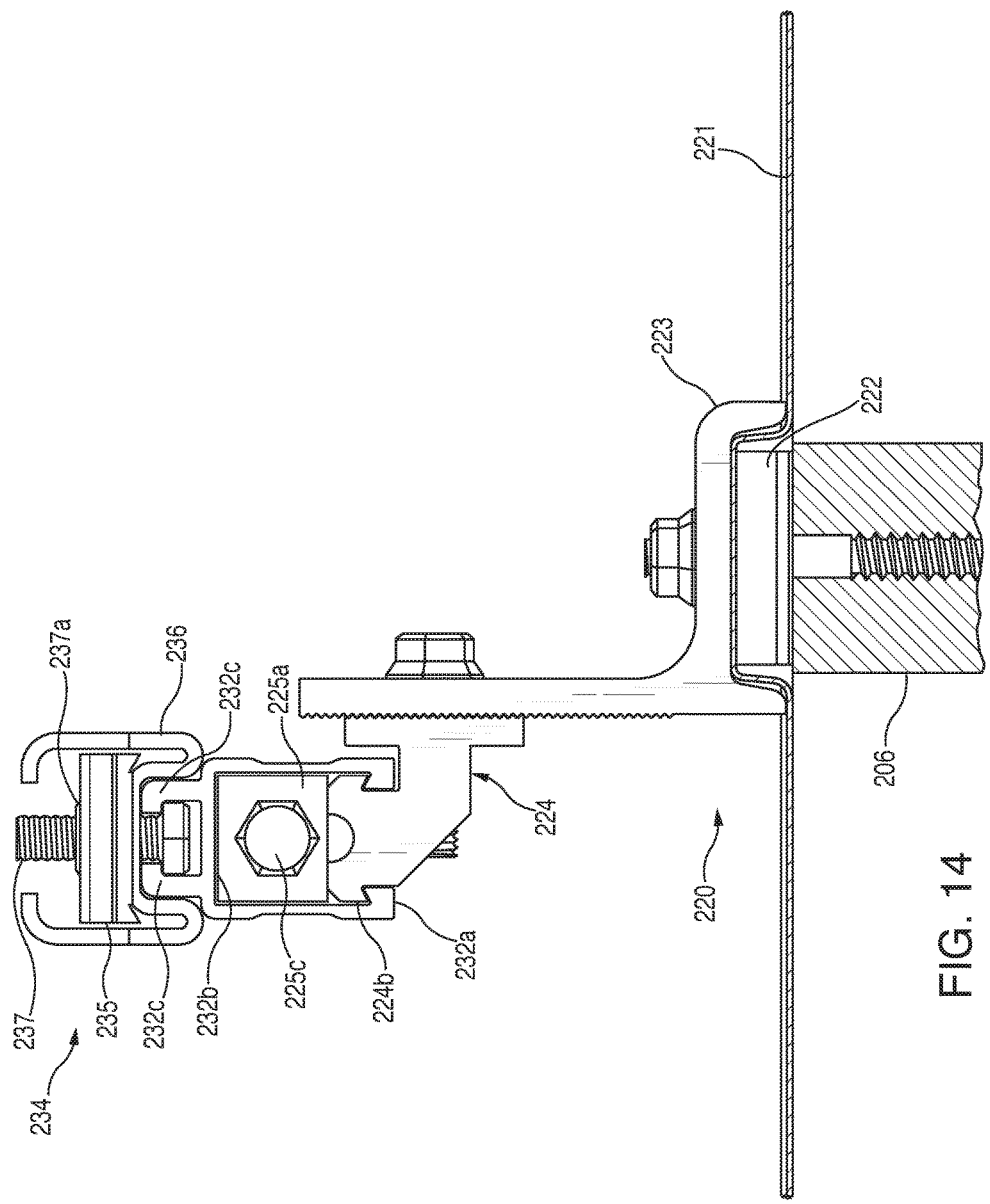
FIG. 14 shows a front elevation view of a height-adjustable base member coupled to a slidable attachment member, in accordance with various embodiments.

FIG. 14 shows a front elevation view of height-adjustable base member 220 coupled to slidable attachment member 230, in accordance with various embodiments. In particular, FIG. 14 shows flanges 232a of rail 232 engaged with the complementary flanges 224b of arm 224. Engagement of flanges 224b with flanges 232a may permit slidable attachment member 230 one dimensional movement with respect to arm 224, in a direction substantially parallel with the installation surface.

Once flanges 224b are moved into engagement with flanges 232a, fastener 225c may be tightened, moving wedges 225a and 225b into engagement with horizontal surface 232b of rail 232, pulling flanges 232a against flanges 224b, and generally resisting movement of rail 232 with respect to arm 224. To further resist movement of rail 232 with respect to arm 224, one or more of the surfaces of flanges 232a, flanges 224b, wedges 225a and 225b, and horizontal surface 232b may be ridged or otherwise textured.

Rail 232 may further include L-shaped flanges 232c extending substantially perpendicularly from horizontal surface 232b in a direction opposing the installation surface. Flanges 232c may be inwardly facing L-shaped members that may serve to retain the head of fastener 237. Fastener 237 may then serve as a mounting point for module retaining assembly 234.

Module retaining assembly 234 may include lip bracket 236 and spring clip 235. Lip bracket 236 may be a generally W-shaped member with the hump of the W configured to rest atop flanges 232c of rail 232. An aperture formed in the hump may be configured to accept fastener 237.

Spring clip 235 may be a two-sided clip structure having a flat central section and two clips extending from the flat central section. The flat central section of spring clip 235 may rest atop the hump of lip bracket 236 and include an aperture substantially coincident with the aperture of lip bracket 236 configured to receive fastener 237. Nut 237a may threadably engage fastener 237 in order to secure lip bracket 236 and spring clip 235 to rail 232.

Figure 15:
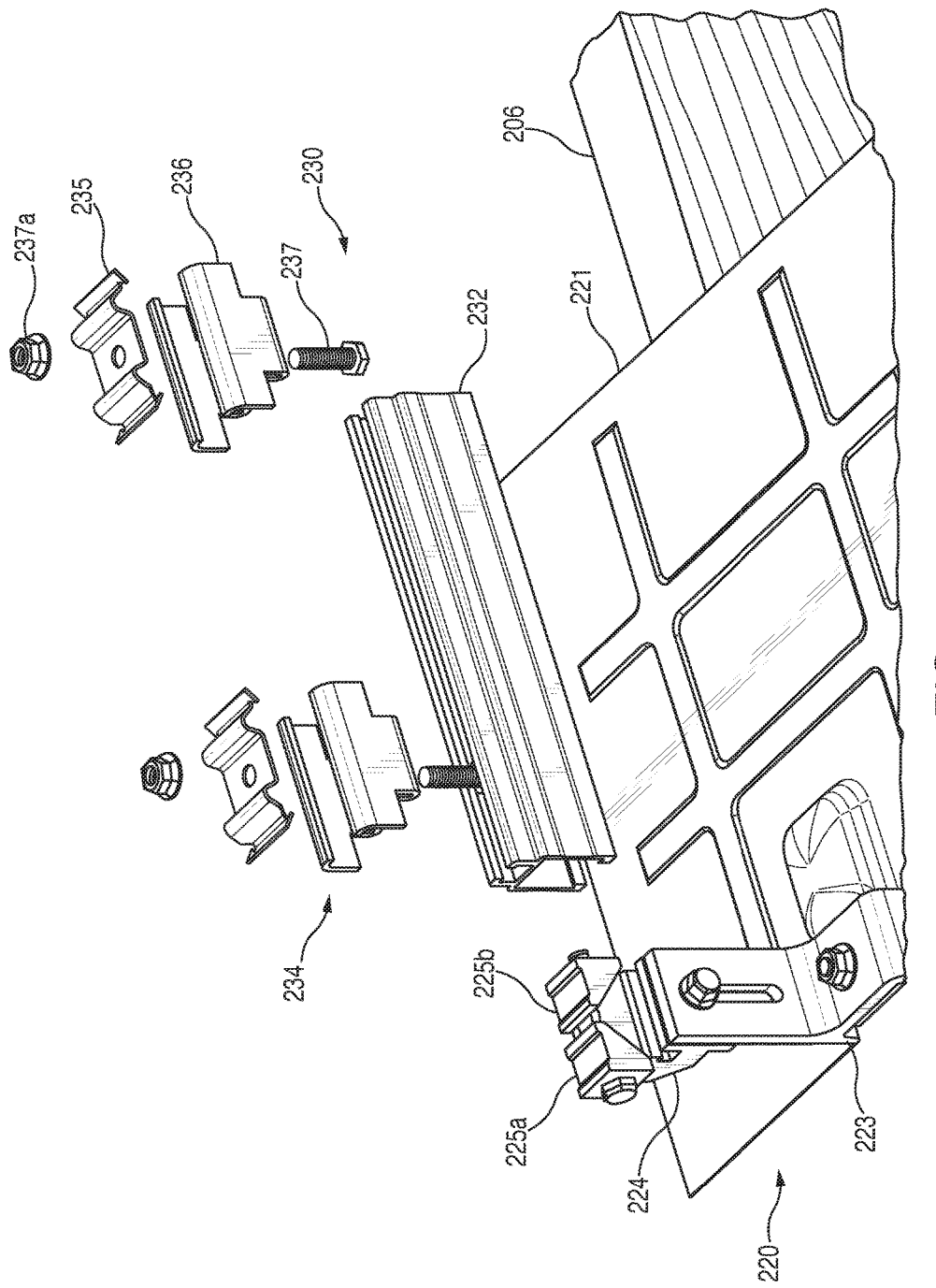
FIG. 15 shows a partially exploded view of a slidable attachment member coupled to a height-adjustable base member, in accordance with various embodiments.

FIG. 15 shows a partially exploded view of slidable attachment member 230 coupled to height-adjustable base member 220, in accordance with various embodiments.

Figure 16:
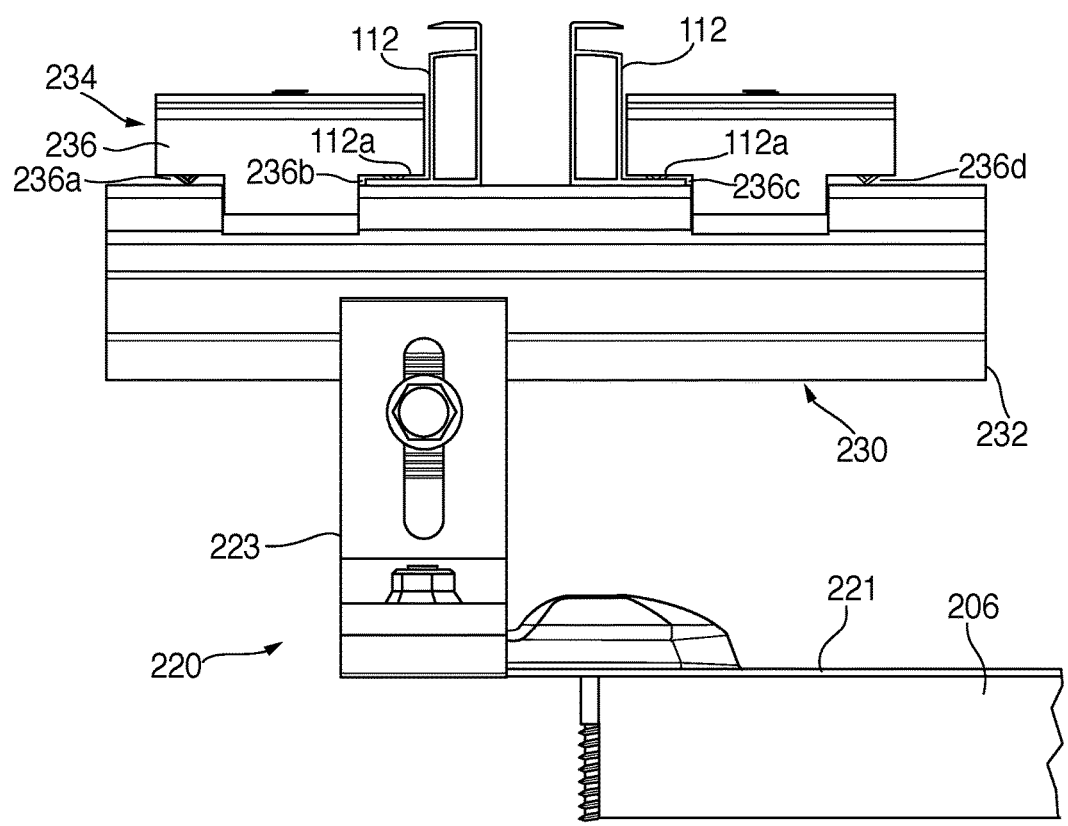
FIG. 16 shows a side elevation view of a height-adjustable base member coupled to a slidable attachment member and module frames retained in the slidable attachment member, in accordance with various embodiments.

FIG. 16 shows a side elevation view of height-adjustable base member 220 coupled to slidable attachment member 230 and module frames 112 retained in slidable attachment member 230, in accordance with various embodiments. As may be appreciated with reference to FIG. 16, lip brackets 236 may include an extended portion that creates slots 236a-236d, which may be configured to receive frame flange 112a of frame 112. Frame flanges 112a may also be retained under clip ends of spring clips 235. The configuration depicted in FIG. 16 may be representative of height-adjustable base member 220 being used to support two solar modules (not shown) supported by frames 112 at an interior position of a solar module array, such as system 100 of FIG. 1.

Figure 17:
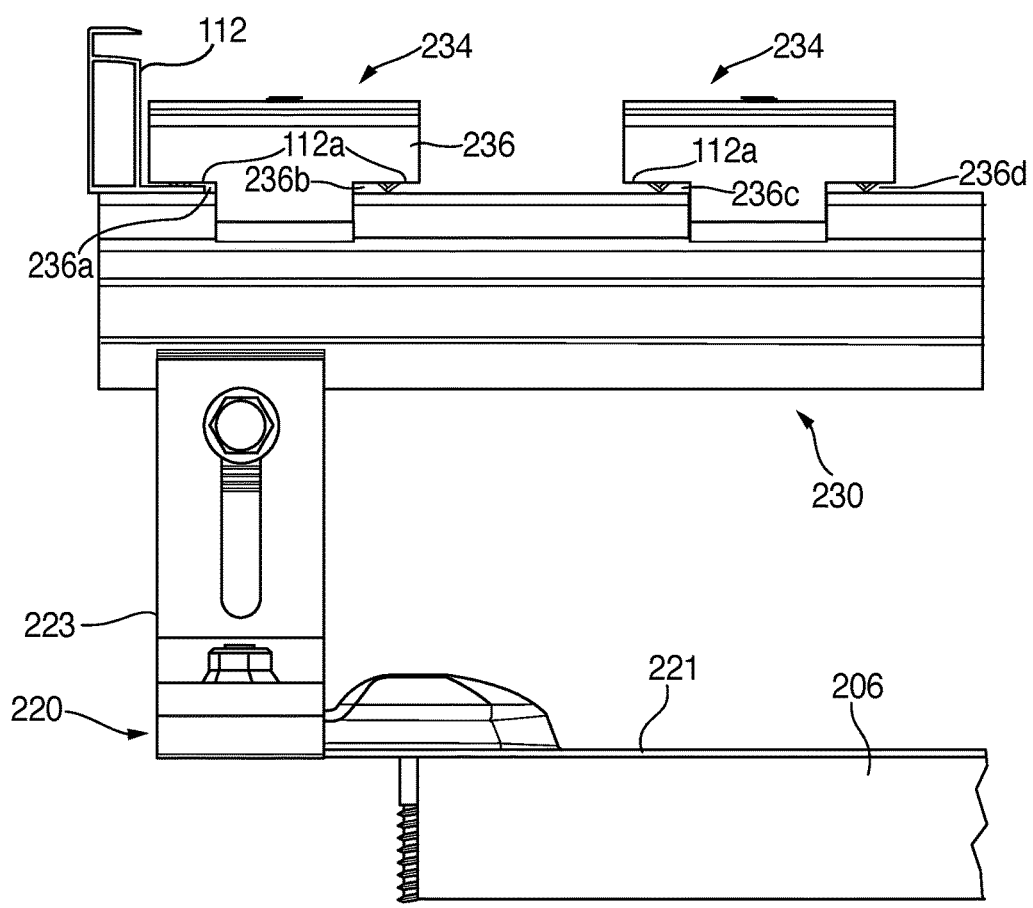
FIG. 17 shows a side elevation view of a height-adjustable base member coupled to a slidable attachment member and a single module frame retained in a slidable attachment member, in accordance with various embodiments.

FIG. 17 shows a side elevation view of height-adjustable base member 220 coupled to slidable attachment member 230 and a single module frame 112 retained in slidable attachment member 230, in accordance with various embodiments. The configuration depicted in FIG. 17 may be representative of height-adjustable base member 220 being used to support a single solar module (not shown) supported by frame 112 at an exterior position of a solar module array, such as system 100 of FIG. 1.

Figure 18A:
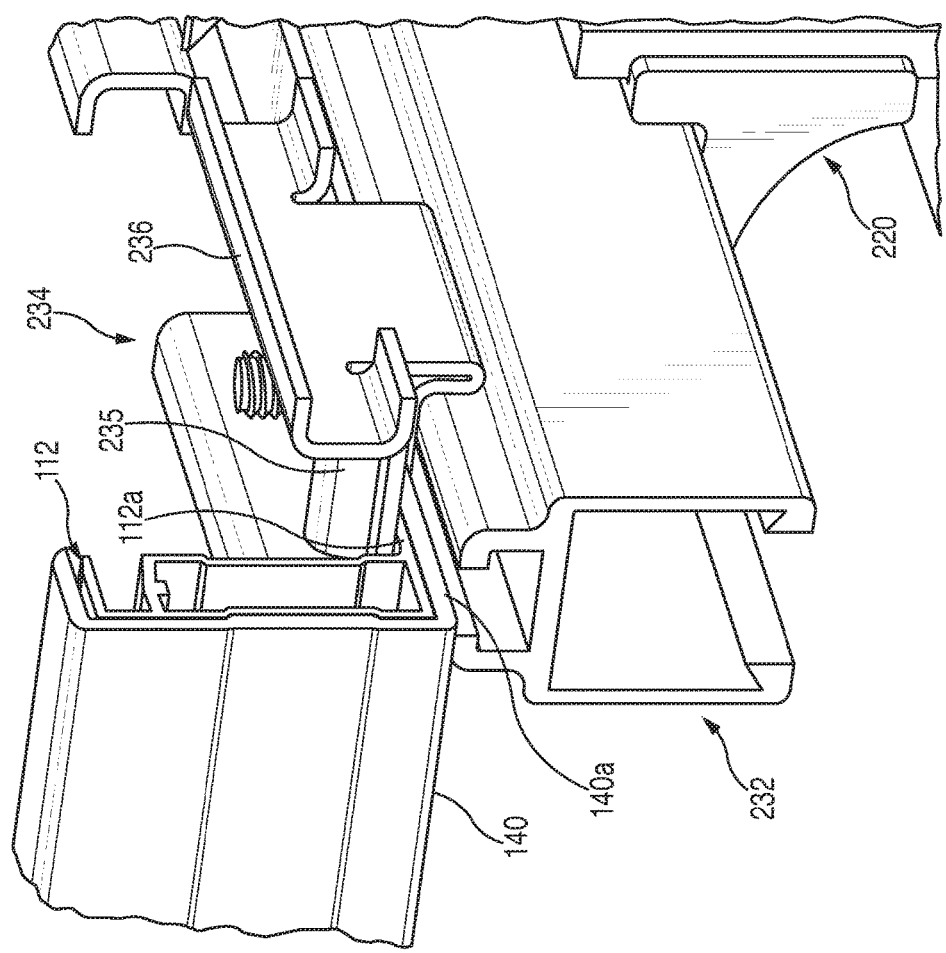
FIG. 18A shows a perspective view of a module frame and a module link retained in a slidable attachment member, in accordance with various embodiments.

FIG. 18A shows a perspective view of module frame 112 and module link 140 retained in slidable attachment member 230, in accordance with some embodiments. As noted above, module links 140 may attach to module frames 112 to provide structural coupling between the adjacent solar modules. As depicted in FIG. 18A, module link 140 may be a C-shaped member that can generally surround module frame 112 on three sides in a nested configuration. Thus, frame flange 112a can rest atop lower flange 140a of module link 140, and both frame flange 112a and lower flange 140a may be retained in slidable attachment member 234. For example, frame flange 112a and lower flange 140a may be slid into a slot of lip bracket 236 and retained in place with spring clip 235.

Figure 18B:
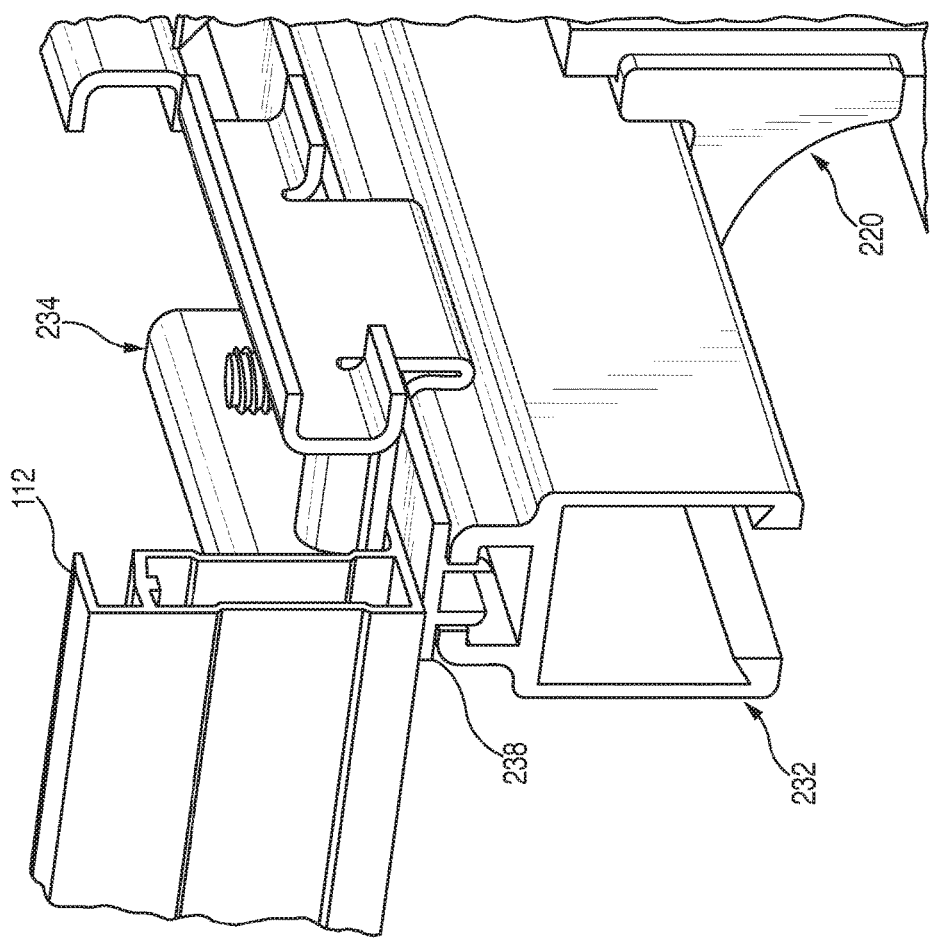
FIG. 18B shows a perspective view of a module frame retained in a slidable attachment member, in accordance with some embodiments.

FIG. 18B shows a perspective view of module frame 112 retained in slidable attachment member 230, in accordance with some embodiments. In particular, FIG. 18B is similar in all respects to FIG. 18A, except that module link 140 is omitted. In place of lower flange 140a of module link 140, spacer 238 can be provided between frame flange 112a and rail 232. Spacer 238 can raise frame flange 112a to substantially the same height as it would rest if supported by lower flange 140a as in FIG. 18A.

Figure 18C:
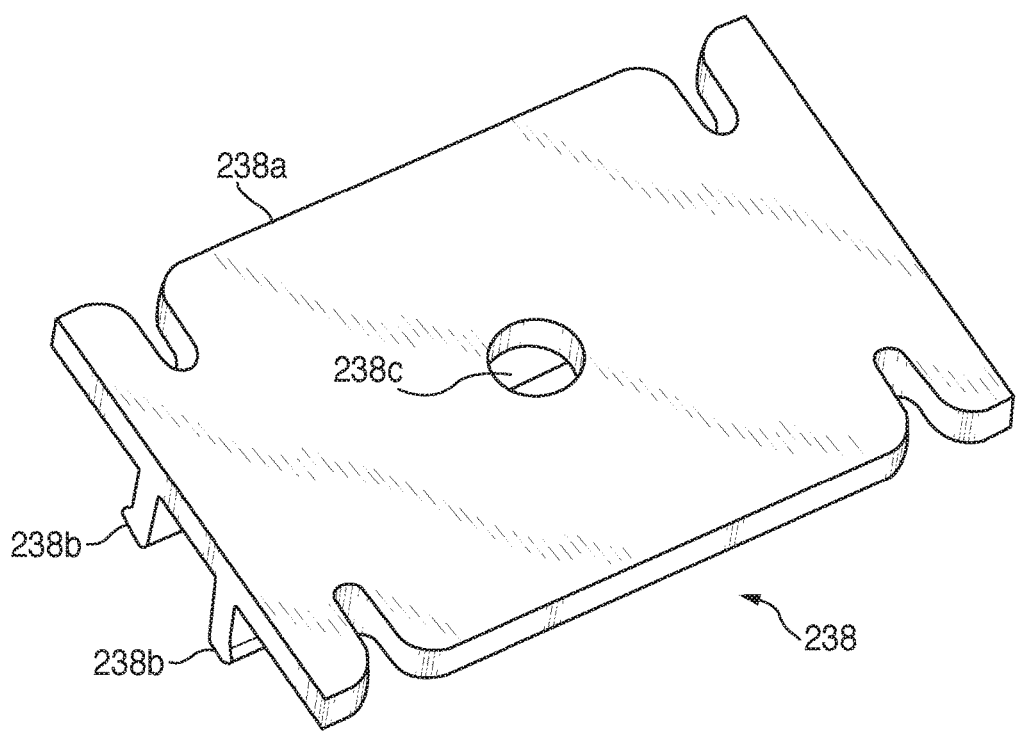
FIG. 18C shows a perspective view of a spacer, in accordance with various embodiments.

FIG. 18C shows a perspective view of spacer 238, in accordance with various embodiments. Spacer 238 can include flanged walls 238b extending away from spacing member 238a. The thickness of spacing member 238a can be chosen to raise frame flange 112a to substantially the same height as it would rest if supported by lower flange 140a as in FIG. 18A. Spacer 238 may also include aperture 238c and string line features to facilitate removal from rail 232. Using spacer 238 in this manner can ease installation in a number of ways. First, the use of spacer 238 can permit an installer or manufacturer to assemble slidable attachment members 230 in advance regardless of whether the component will be used to retain frame flange and module link or only a frame flange. At installation time, spacer 238 can be added whenever a module link is not present and omitted when a module link is present. Second, using spacer 238 to elevate frame flange 112 when no module link is present avoids the need for differently sized retaining assemblies 234 for frame only locations and for frame plus module link locations.

FIG. 19A shows a perspective view of a portion of solar panel installation system 200, in accordance with some embodiments. System 200 may include solar modules 110 coupled together with module link 140 and supported by height-adjustable base members 220a and 220b. Height-adjustable base member 220a is placed vertically below module link 140, as in the view provided in FIG. 18A while height-adjustable base member 220b is placed below module frame 112 at a position not covered by module link 140, as in the view provided in FIG. 18B. Accordingly, spacer 238 may be provided between the rail and the slidable adjustment member mounted above height-adjustable base member 220b and omitted above height-adjustable base member 220a.

Furthermore, FIG. 19A depicts the ends of rails 232 being covered by end caps 233, which may enhance the aesthetics of system 200. It should be understood that end caps, such as end caps 233, may be provided for use with any of the embodiments disclosed herein. In some embodiments, end caps 233 may be configured to slidably and/or snappingly engage the ends of rails 232. End caps 233 may additionally or alternatively be coupled to rails 232 with one or more fasteners, adhesives, or combinations thereof.

Figure 19B:
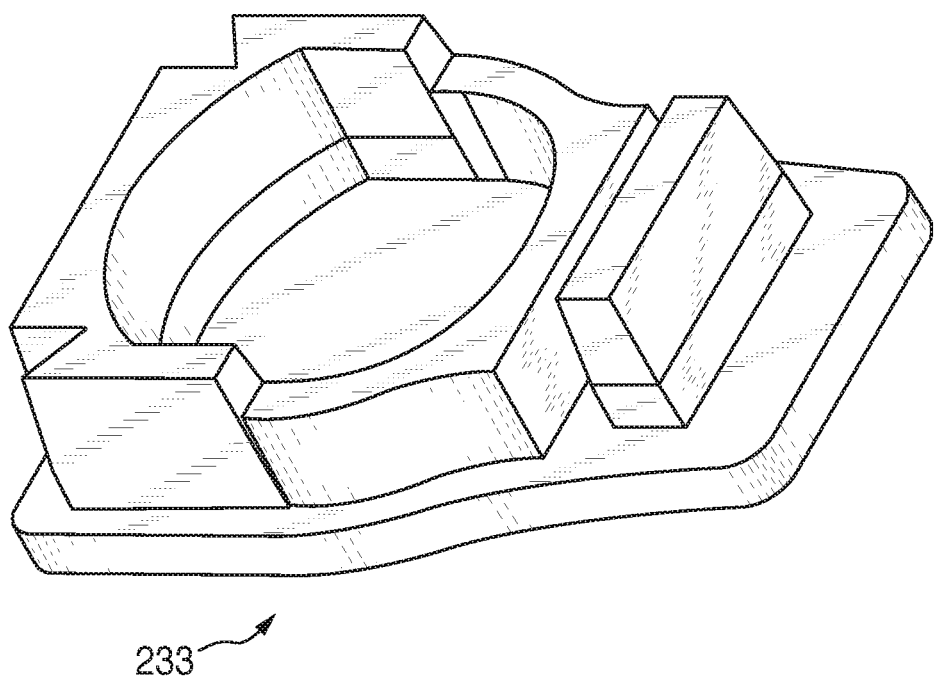
FIG. 19B shows a perspective view of an end cap, in accordance with various embodiments.

FIG. 19B shows a perspective view of end cap 233, in accordance with various embodiments.

Figure 20A:
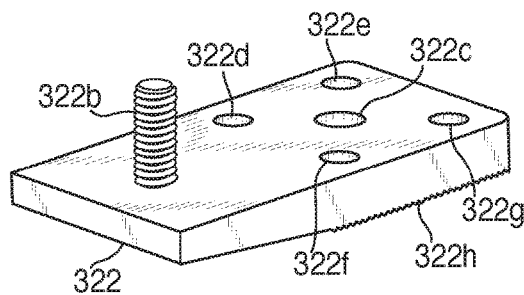
FIG. 20A shows a perspective view of an L-foot base, in accordance with various embodiments.

FIG. 20A shows a perspective view of L-foot base 322, which can embody an alternate implementation of L-foot base 222, in accordance with various embodiments. L-foot base 322 may, like L-foot base 222, include threaded stud 322b and aperture 322c. Additionally, or as an alternative to aperture 322c, L-foot base 322 can include apertures 322d-322g, for receiving fasteners in the event that L-foot base 322 is being fastened to an I-beam shaped joist, such as an I-joist, or a TJI joist, for example. Furthermore, teeth 322h may be formed on the side of L-foot base 322 configured to contact the installation surface in order to prevent twisting of L-foot base 322 with respect to the installation surface during and after installation.

Figure 20C:
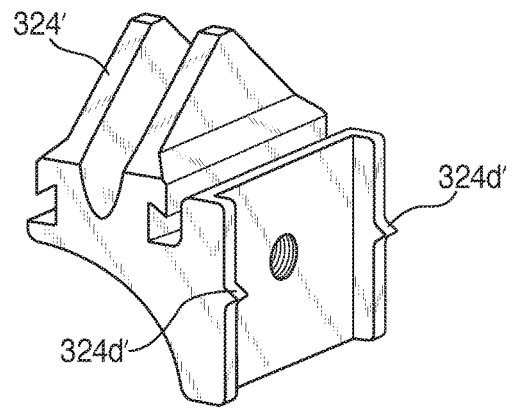
FIG. 20C shows a perspective view of an arm, in accordance with various embodiments.
Figure 20B:
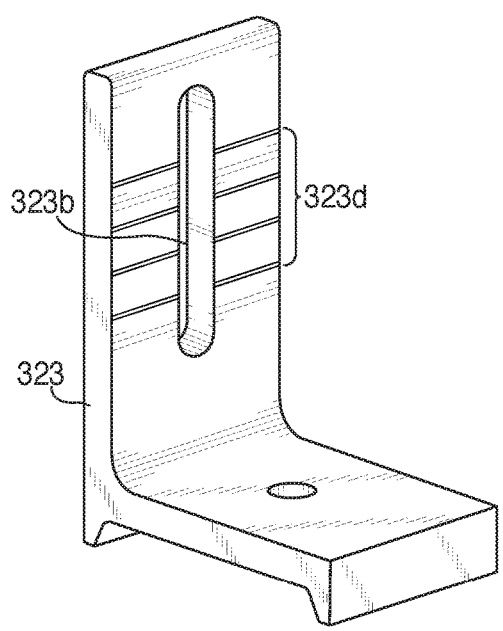
FIG. 20B shows a perspective view of an L-foot, in accordance with various embodiments.

FIG. 20B shows a perspective view of L-foot 323, which can embody an alternate implementation of L-foot 223, in accordance with various embodiments. In particular, L-foot 323 can include leveling marks 323d running perpendicular to the longitudinal direction of longitudinal slit 323b. Leveling marks 323d can provide an installer with a visual reference point for determining the proper vertical installation position of arm 324. Although not depicted in FIGS. 20B and 20C, L-foot 323 and arm 324 can include complementarily ribbed surfaces to facilitate slip-free coupling, like arm 224 and L-foot 223.

FIG. 20C shows a perspective view of arm 324, which can embody an alternate implementation of arm 224 or arm 324, in accordance with various embodiments. Extending from the interlocking portions of the mating surface of arm 324 can include leveling indicators 324d. When arm 324 is installed, leveling indicators 324d may be visible on either side of leveling marks 323d. Therefore, leveling indicators 324d may provide a visual reference point on arm 324 to be compared with leveling marks 323d of L-foot 323 to aid the leveling process during installation.

Figure 21A:
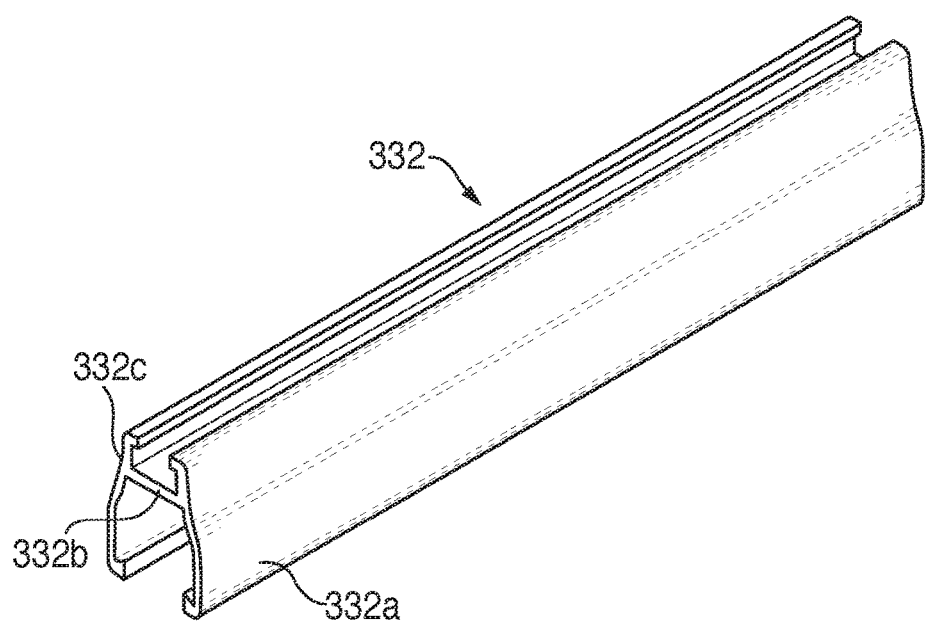
FIG. 21A shows a perspective view of a rail, in accordance with various embodiments.

FIG. 21A shows a perspective view of rail 332, which can embody an alternate implementation of rail 232, in accordance with various embodiments. In contrast with rail 232, which has a stepped profile between L-shaped flanges 232a and L-shaped flanges 232c on either side of horizontal surface 232b, rail 332 can smoothly transition between L-shaped flanges 332a and L-shaped flanges 332c on either side of horizontal surface 332b. In comparison with rail 232, rail 332 may be formed with less material and provide better alignment with arm 324 having leveling indicators 324d.

Figure 21B:
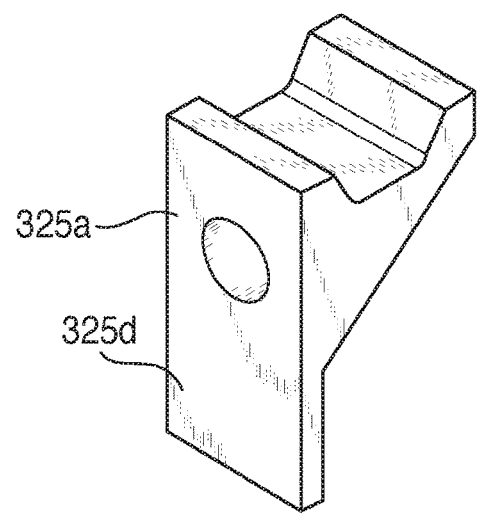
FIG. 21B shows a perspective view of a wedge, in accordance with various embodiments.

FIG. 21B shows a perspective view of wedge 325a, which can embody an alternate implementation of wedge 225a, in accordance with various embodiments. In contrast with wedge 225a, wedge 325a can include a feature that visually distinguishes it from wedge 225b. As depicted, that feature can be extended portion 325d, which, when installed, can extend from the body of wedge 325a towards the installation surface. Extended portion 325d may form a stop against the side of an arm (e.g., arm 224, arm 224', or arm 324) to prevent wedge 325a from moving too close to wedge 225b, which may interfere with the installation of rail 232 or rail 332 over height-adjustable base member 220.

FIG. 22 shows a partially exploded perspective view of height-adjustable base member 320 coupled to slidable attachment member 330, which can embody alternate implementations of height-adjustable base member 220 and slidable attachment member 230, respectively, in accordance with some embodiments. For example, height-adjustable base member 320 coupled to slidable attachment member 330 can include rail 332, wedges 325a, L-foot base 322, L-foot 323, arm 324, and various other components described below that are not included in height-adjustable base member 220 or slidable attachment member 230.

As may be appreciated with reference to FIG. 22, leveling indicators 324d can visually indicate the mounting point of arm 324 with respect to leveling marks 323d of L-foot 323. This visual indication can aid installers by providing visual cues to help ensure consistently level installation.

Module retaining assemblies 334 may be functionally similar to module retaining assemblies 234 insofar as they may be used to retain module frames as discussed in more detail below. However, module retaining assembly 334 can include a number of components not present in module retaining assembly 234, including rotation key 336, spring clip 335, clamping stop 339, and resilient cap 331.

Rotation key 336 can include rail engaging walls 336a, horizontal member 336b, and locking walls 336c. Rail engaging walls 336a, which may run substantially parallel to one another, can extend substantially parallel from horizontal member 336b in a direction toward the installation surface, as installed. These rail engaging walls may be spaced apart from one another by a distance suitable to cause engagement with the outer sides of L-shaped flanges 332c, thereby preventing rotation of rotation key 336 with respect to rail 332. In alternative embodiments, rail engaging walls 336a may be spaced to fit between, and may include features that clip into, L-shaped flanges 332c.

Horizontal member 336b can rest atop L-shaped flanges 332c, or spacers 338 if provided, when rotation key 336 is engaged with rail 332. Fastener 337 can extend substantially perpendicularly away from horizontal member 336b in a direction away from the installation surface, as installed. Fastener 337, according to various embodiments, may be a traditional threaded fastener with a head and a threaded shaft, or it may be a threaded stud integrally formed with, or coupled to rotation key 336.

Also extending substantially perpendicularly away from horizontal member 336b in a direction away from the installation surface, as installed, are locking walls 336c. Locking walls 336c may run substantially parallel to one another and can be spaced apart by a distance suitable to receive, with little or no play, features of spring clip 335 and clamping stop 339. By receiving spring clip 335 and clamping stop 339 between locking walls 336c, rotation key 336 can prevent rotation of the entirety of module retaining assembly 334 with respect to rail 332 when installed.

Module retaining assembly 334 may include spring clip 335, which, like spring clip 235, can include a flat central section and two clips extending from the flat central section. The flat central section of spring clip 335 may rest atop horizontal member 336b and include an aperture substantially coincident with an aperture of rotation key 336 configured to receive fastener 337. The width of the flat central section of spring clip 335, as measured transverse to the direction in which the clips extend, may be substantially similar to the spacing of locking walls 336c such that the flat central section non-rotatingly engages locking walls 336c.

Clamping stop 339 may rest atop spring clip 335 to exert a force directed toward the installation surface on the clips of spring clip 335 and to support a solar module above the upper bounds of rail 332. Accordingly, clamping stop 339 can include a first side arranged closest to the installation surface, as installed, having a flat central section that engages the flat central section of spring clip 335, two flanges that exert the force on the clips of spring clip 335, and an aperture extending from the flat central section to a second side of the clamping stop. The second side of the clamping stop may generally face away from the installation surface, as installed, and can include one or more features, such as a mesa extending away from the second side, for example, for receiving resilient cap 331 (e.g., with an interference fit). Resilient cap 331 may also be coupled to clamping stop 339 with one or more of a fastener, clip, or adhesive and may protect the back surface of a solar module installed upon slidable attachment member 330. Fastener 337 may extend through the aperture of clamping stop 339, and nut 337a may threadably engage fastener 337 in order to secure clamping stop 339 and spring clip 335 to rail 332.

Figure 23:
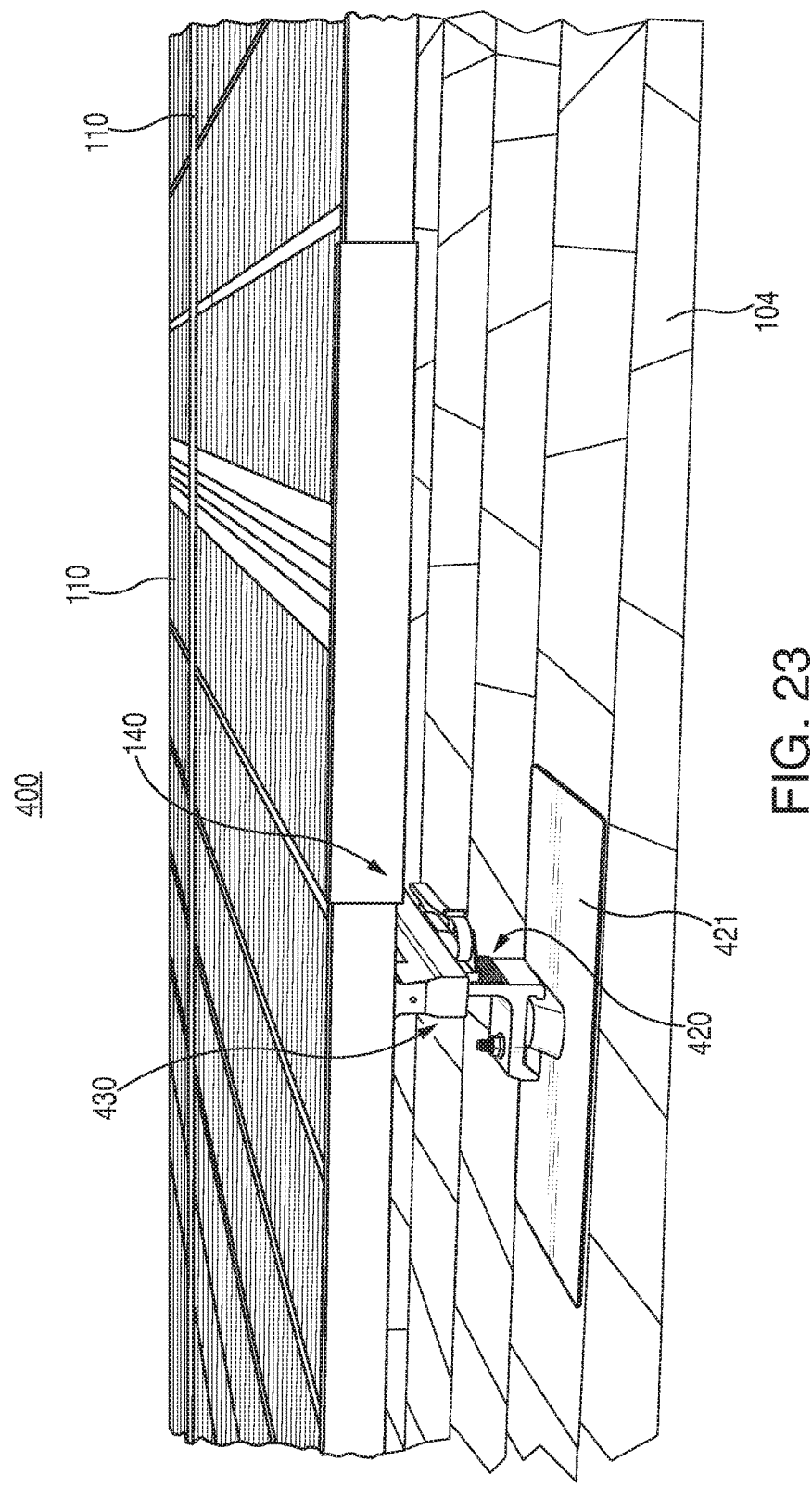
FIG. 23 shows a perspective view of a solar panel installation system, in accordance with various embodiments.

FIG. 23 shows a perspective view of system 400, including solar module 110 supported by height-adjustable base member 420, in accordance with various embodiments. Height-adjustable base member 420 is configured to be installed on an installation surface using an aperture-less flashing—namely, base plate 421. Height-adjustable base member 420 may slidably receive slidable attachment member 430, which may, in turn, slidably receive a portion (e.g., a flange) of frame 112 of solar module 110. Accordingly, height-adjustable base member 420 can support an edge of solar module 110 above the installation surface in a height-adjustable manner. Advantageously, system 400 does not require any holes to be made in the flashing, which can significantly reduce the potential for moisture to reach installation surface 104 below base plate 421 thereby eliminating a major source of leaks in commercial and residential roof-mounted solar panel installations.

FIG. 24 shows an exploded view of a portion of height-adjustable base member 420, in accordance with various embodiments. In particular, FIG. 24 depicts L-foot base 422 coupleable to roof rafter 406 (or other suitable structural member) with fastener 422a. Fastener 422a can be inserted through apertures 422c formed in L-foot base 422 and can be accommodated beneath raised portion 421a of base plate 421. L-foot base 422 can also have a keyed cross-sectional profile with keyed channels 422b that can mate with complementarily shaped features of an L-foot. FIG. 25 shows a detailed perspective view of L-foot base 422, in accordance with various embodiments.

Figure 26:
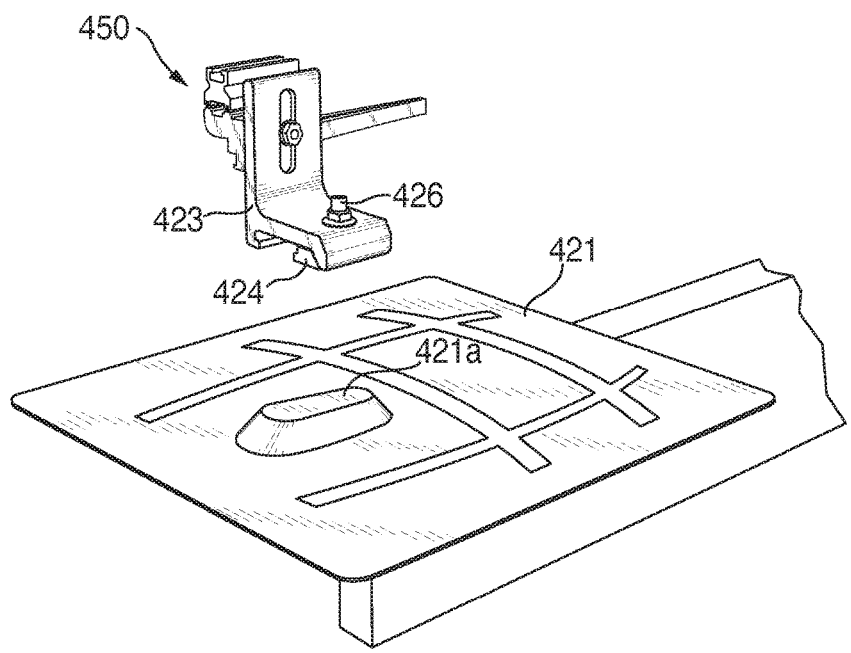
FIG. 26 shows an exploded perspective view of a solar panel installation system, in accordance with various embodiments.
Figure 27:
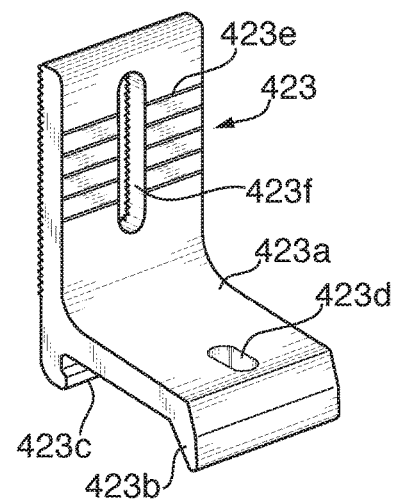
FIG. 27 shows a detailed perspective view of an L-foot, in accordance with various embodiments.
Figure 28:
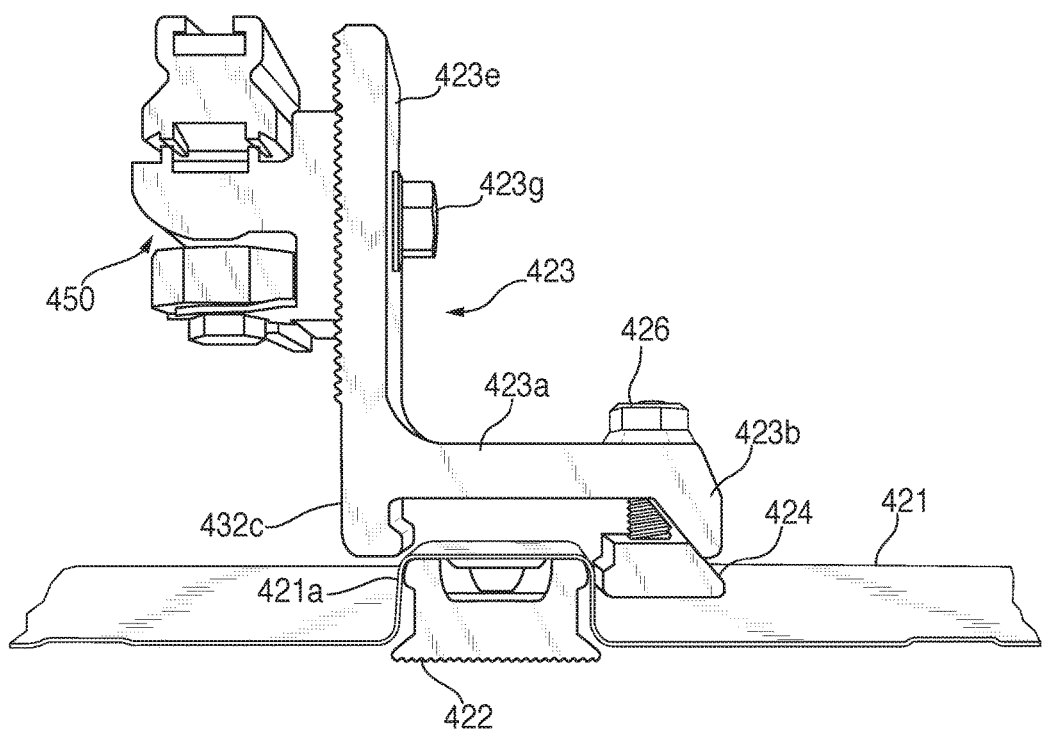
FIGS. 28 and 29 show cross sectional views of a portion of a solar panel installation system, in accordance with some embodiments.
Figure 29:
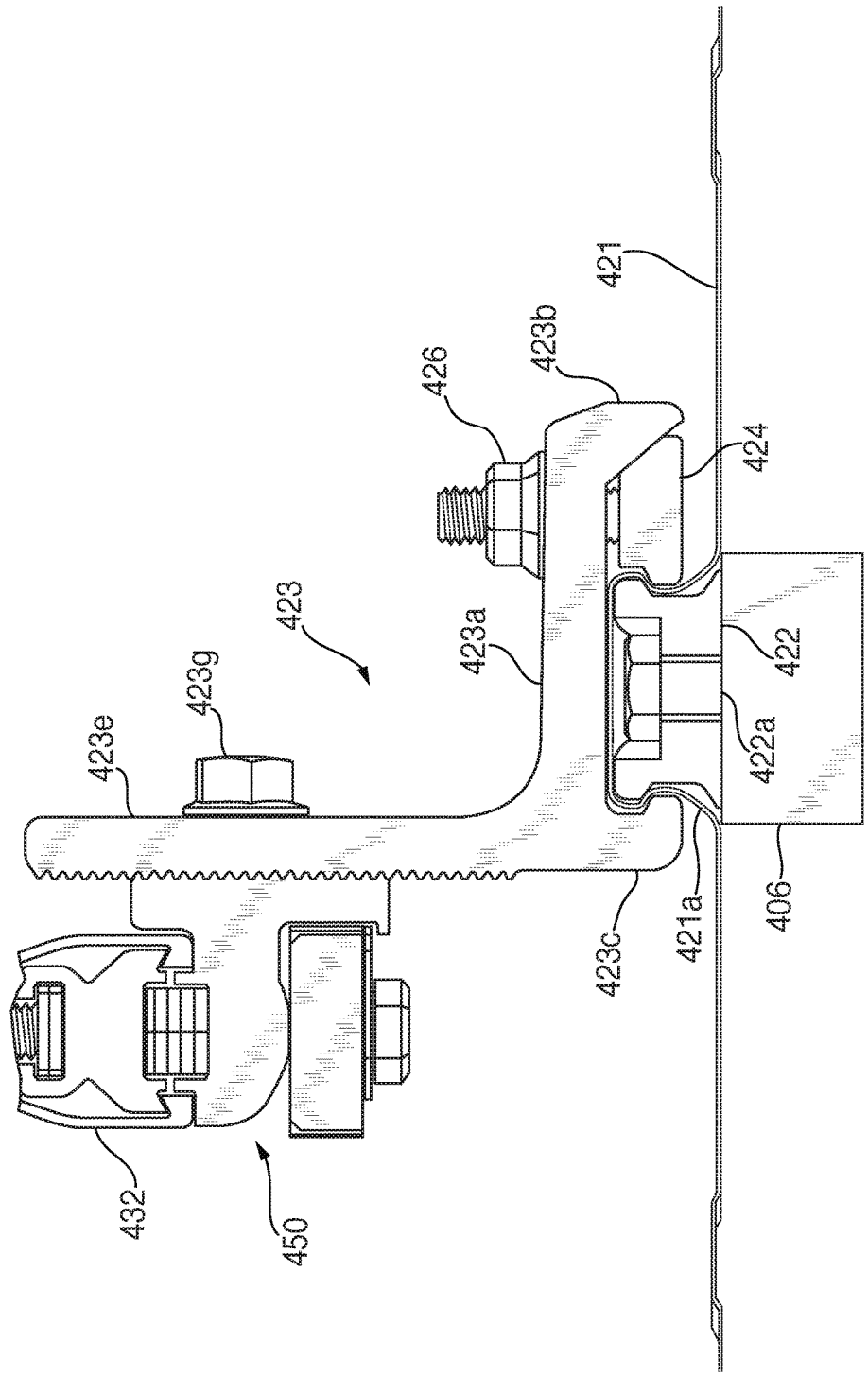

FIG. 26 shows an exploded perspective view and FIGS. 28 and 29 show cross sectional views of a portion of system 400, in accordance with some embodiments. FIG. 27 shows a detailed perspective view of L-foot 423. As shown in FIGS. 26-29, L-foot base 422 and raised portion 421a serve as the attachment point for clamping L-foot 423, which may support one or more other components of height-adjustable base member 420. Clamping L-foot 423 may include horizontal member 423a, clamping wedge 423b, base-engagement leg 423c, aperture 423d, vertical member 423e, and slot 423f formed in vertical member 423e. Clamping L-foot 423 can be coupled to L-foot base 422 through raised portion 421 a using fastener 426.

Clamping wedge 423b and base-engagement leg 423c can extend away from horizontal member 423a in a direction approaching surface 104, as installed, with a space formed therebetween to accept L-foot base 422 and raised portion 421a. Base-engagement leg 423c may extend substantially perpendicularly from horizontal member 423a to engage a first side of L-foot base 422 and raised portion 421a. In embodiments in which L-foot base 422 has a keyed cross-sectional profile, the wall of base engagement leg 423c that engages L-foot base 422 may have a complementarily shaped profile to promote engagement between base engagement leg 423c and keyed channels of L-foot base 422, thereby preventing movement of clamping L-foot 423 relative to base plate 421, especially in a direction extending substantially perpendicularly away from mounting base plate 421.

Clamping wedge 423b can include a sloped surface configured complementarily to a sloped surface of base-coupling wedge 424. Fastener 426 can be inserted through aperture 423d and threadably engage a threaded aperture of base-coupling wedge 424. As fastener 426 is tightened within threaded aperture of base-coupling wedge 424, base-engagement leg 423c and base-coupling wedge 424 may be urged towards opposing sides of L-foot base 422, thereby coupling clamping L-foot 423 to L-foot base 422. As with base-engagement leg 423c, base-coupling wedge 424 may be shaped to form a keyed fit with keyed channels of L-foot base 422 to facilitate attachment therebetween. In some embodiments, the surfaces of clamping wedge 423b and base-coupling wedge 424 that engage L-foot base 422 may include vertically-aligned grooves or ridges formed complementarily with similar grooves or ridges formed on L-foot base 422. These grooves or ridges may prevent lateral movement of height-adjustable base member 420 with respect to base plate 421.

Once coupled to base plate 421, clamping L-foot 423 may serve as a mounting point for one or more other components of system 400. For example, clamping L-foot 423 may support a slidable attachment member 430 using a lever-locking assembly 450.

Figure 30:
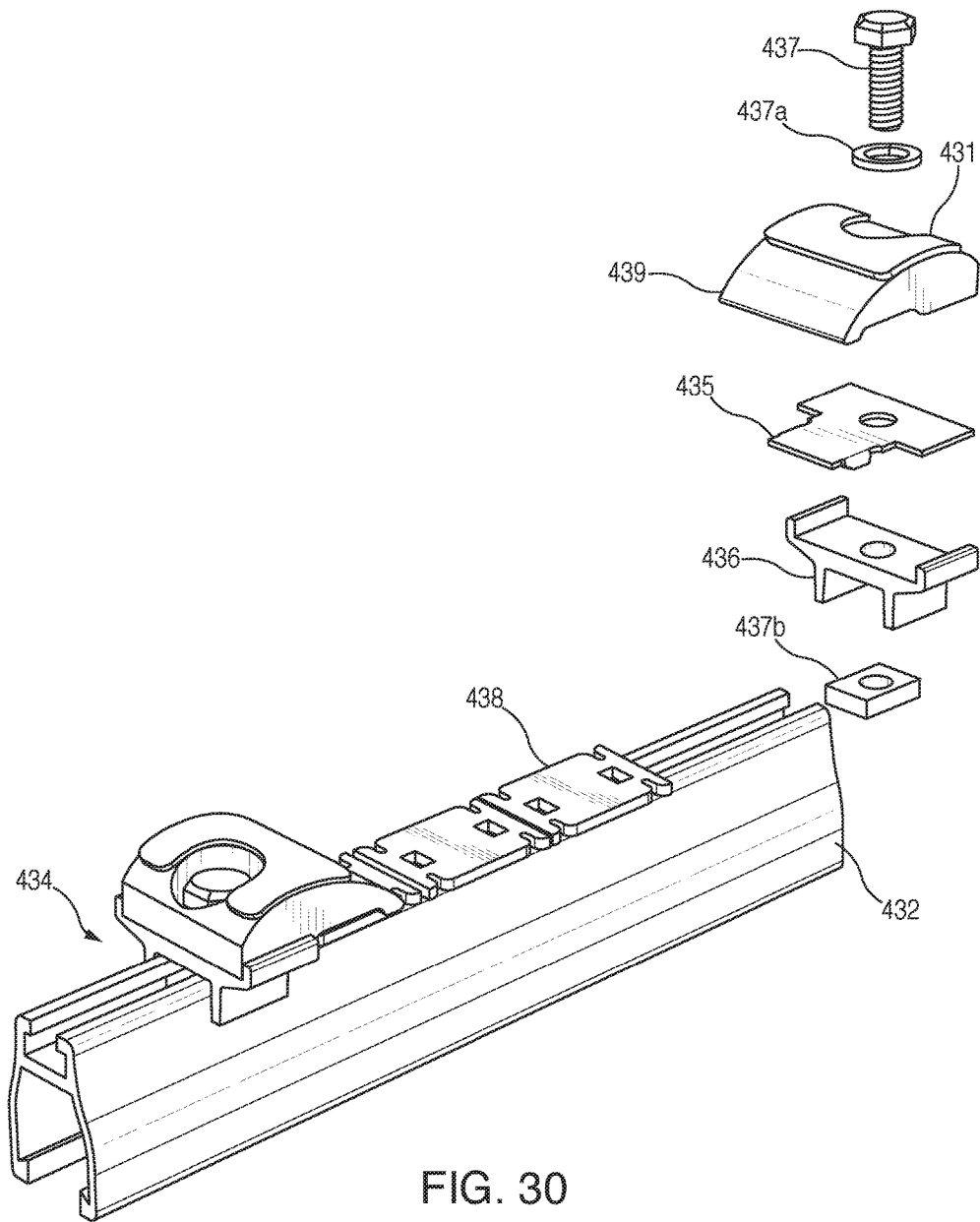
FIG. 30 shows an exploded view of a module retaining assembly, in accordance with various embodiments.

FIG. 30 shows an exploded view of module retaining assembly 434, in accordance with various embodiments. Module retaining assembly 434 is similar to module retaining assembly 334 with the exception that clamping stop 439 is one sided, whereas module retaining assembly 334 includes two-sided clamping stop 339. Additionally, fastener 437 is inserted from the top side of module retaining assembly 434 and into a channel nut 437b retained in the top channel of rail 432. When fastener 437 is tightened into channel nut 437b, module retaining assembly 434 is coupled to the top side of rail 432. In some embodiments, the head of fastener 437 and washer 437a may be retained within a recess formed in the top side of clamping stop 437. Rotation key 436 and spring clip 435 are substantially similar to rotation key 336 and spring clip 335, respectively.

Figure 31:
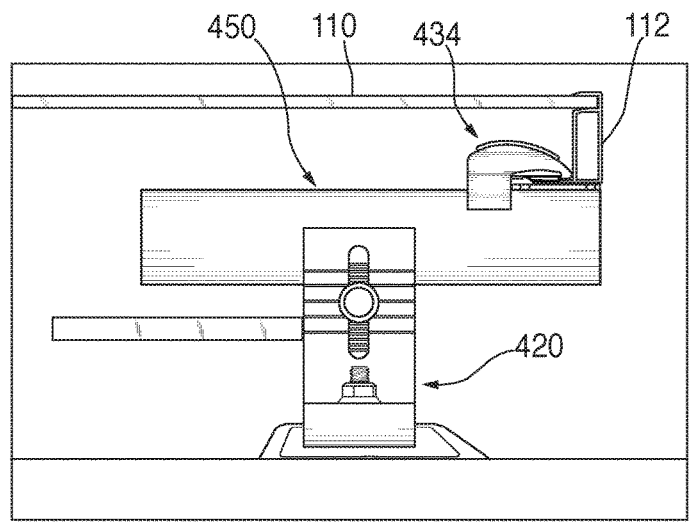
FIG. 31 shows a side view of a solar module attached to a height-adjustable base member, in accordance with some embodiments.
Figure 32:
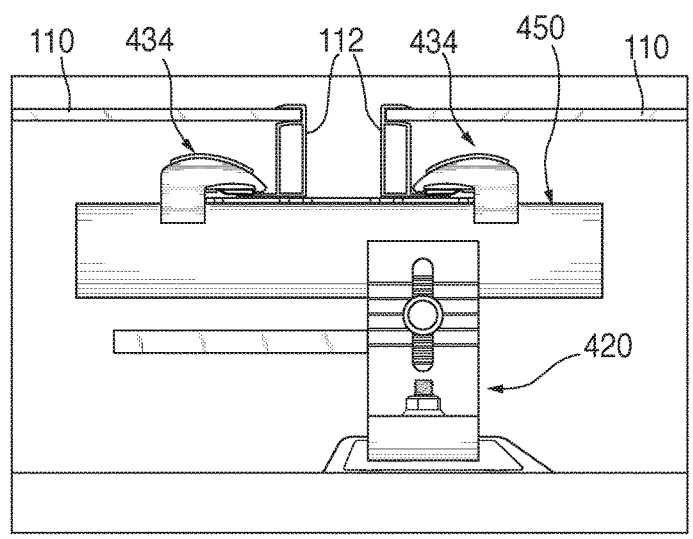
FIG. 32 shows a side view of two solar modules located in the middle of an array attached to a height-adjustable base member, in accordance with various embodiments.

FIG. 31 shows a side view of solar module 110 attached to height-adjustable base member 420, in accordance with some embodiments. Solar module 110 of FIG. 31 is positioned at the end of a row of solar modules. In contrast, FIG. 32 shows a side view of two solar modules 110 located in the middle of an array attached to height-adjustable base member 420.

Figure 33A:
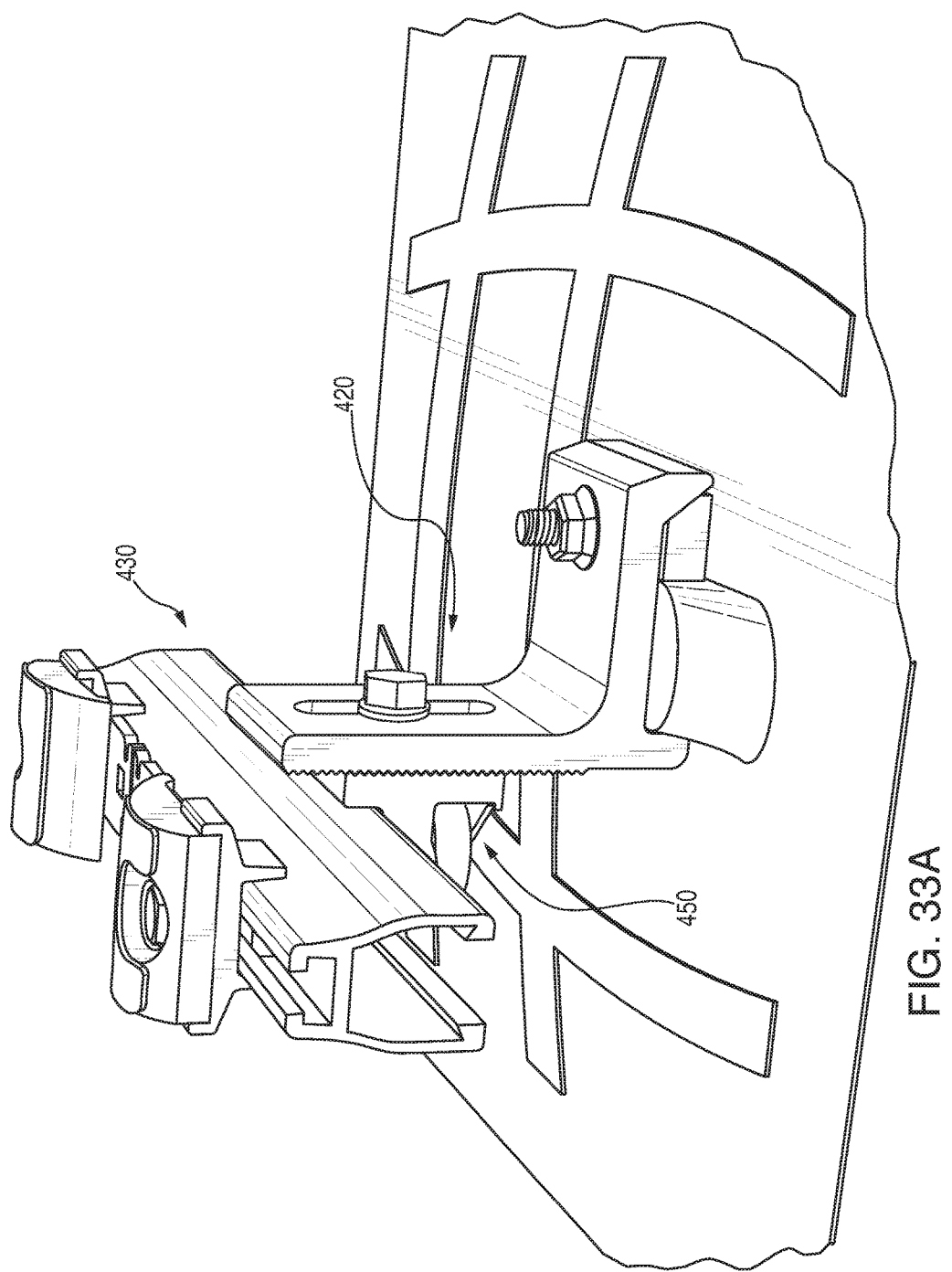
FIGS. 33A and 33B show perspective views of a solar panel installation system, in accordance with various embodiments, in accordance with various embodiments.
Figure 33B:
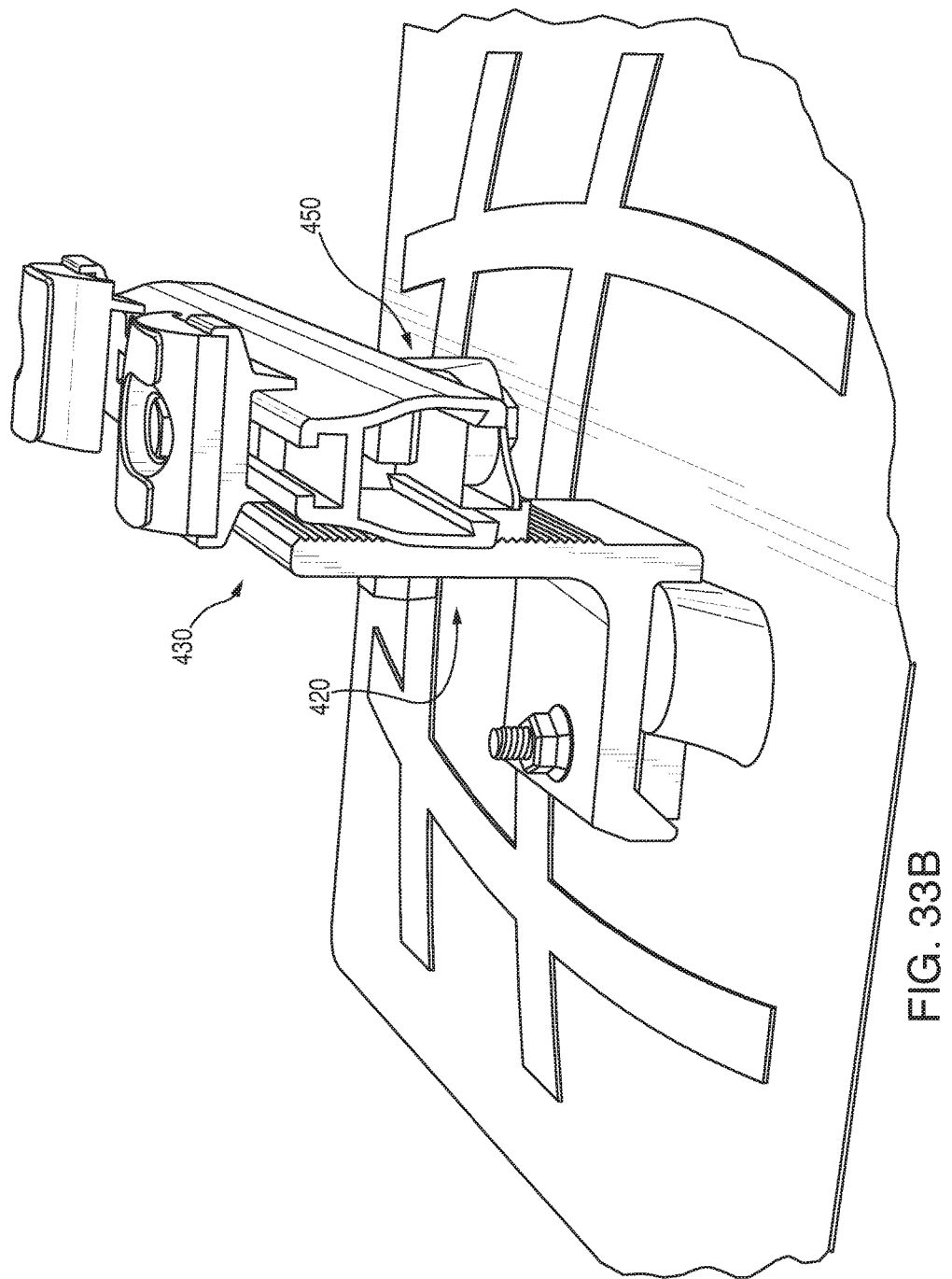
Figure 35:
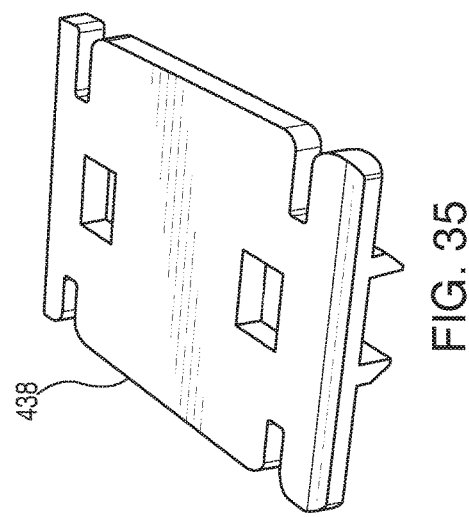
FIGS. 34-37 show perspective views of a solar panel installation system employing spacers, in accordance with various embodiments.
Figure 34:
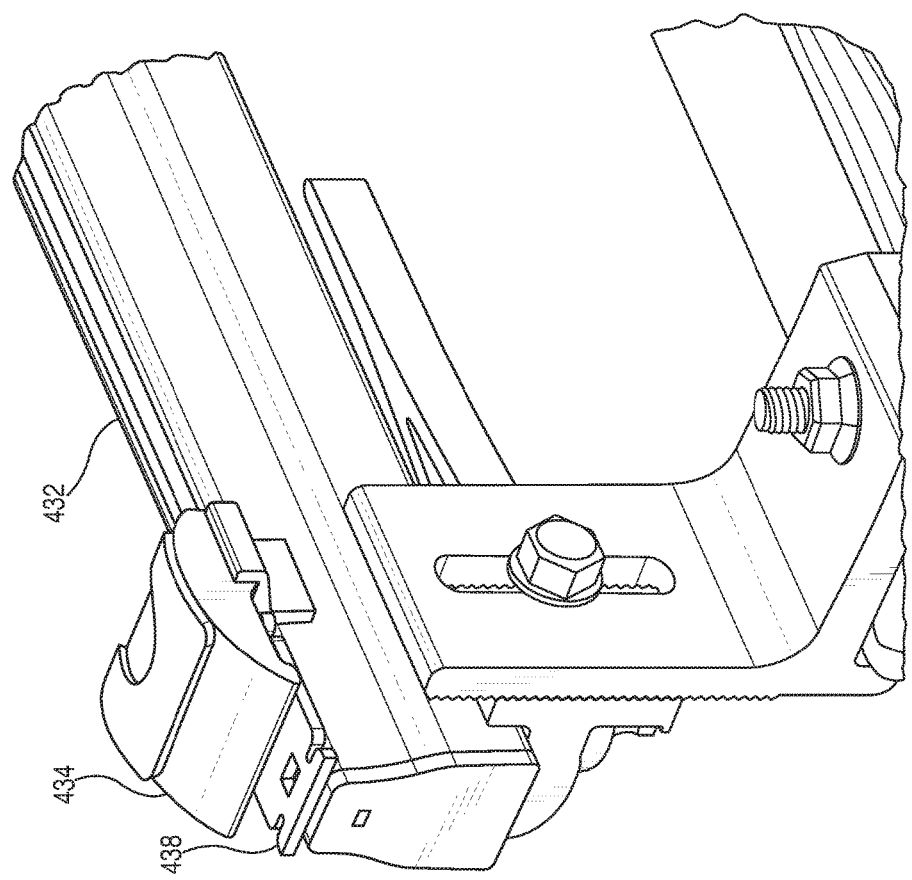
Figure 36:
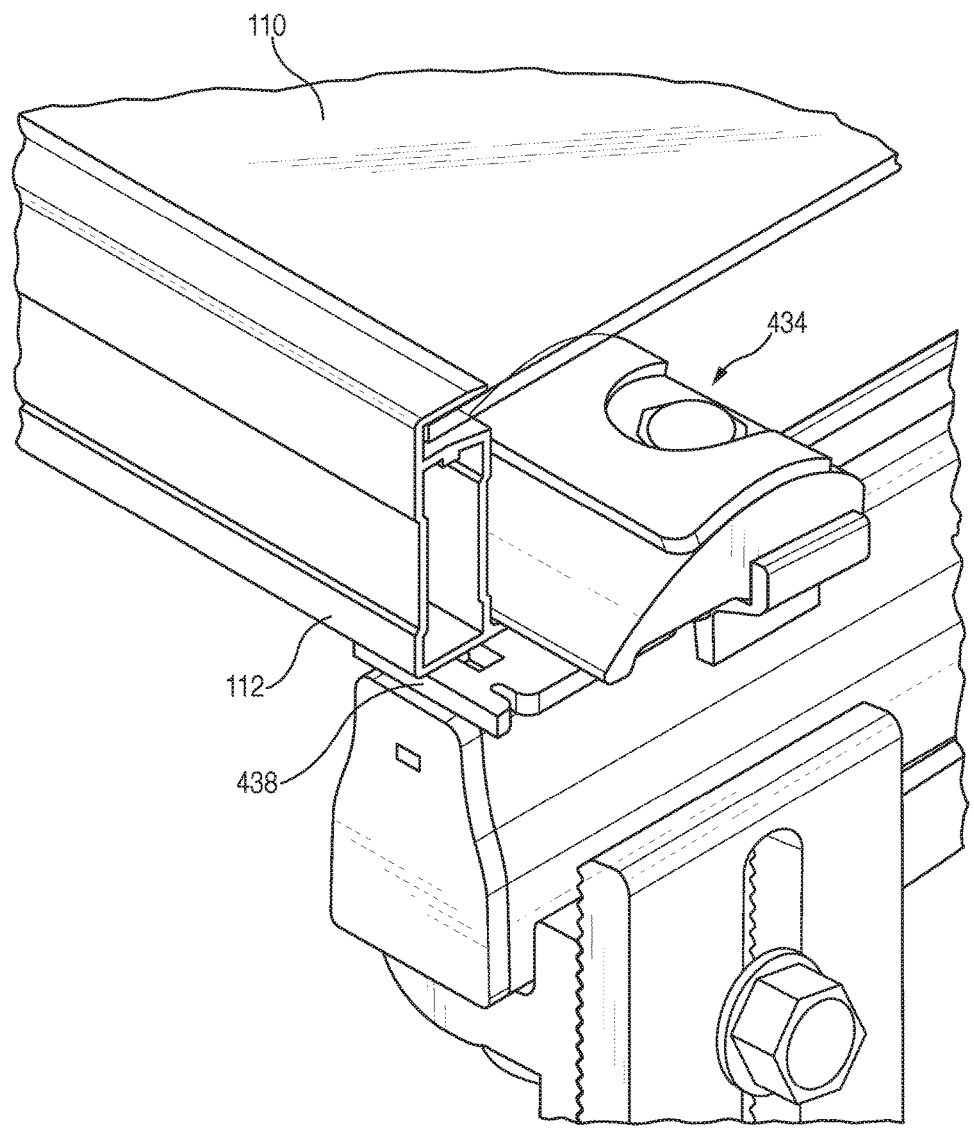
Figure 37:
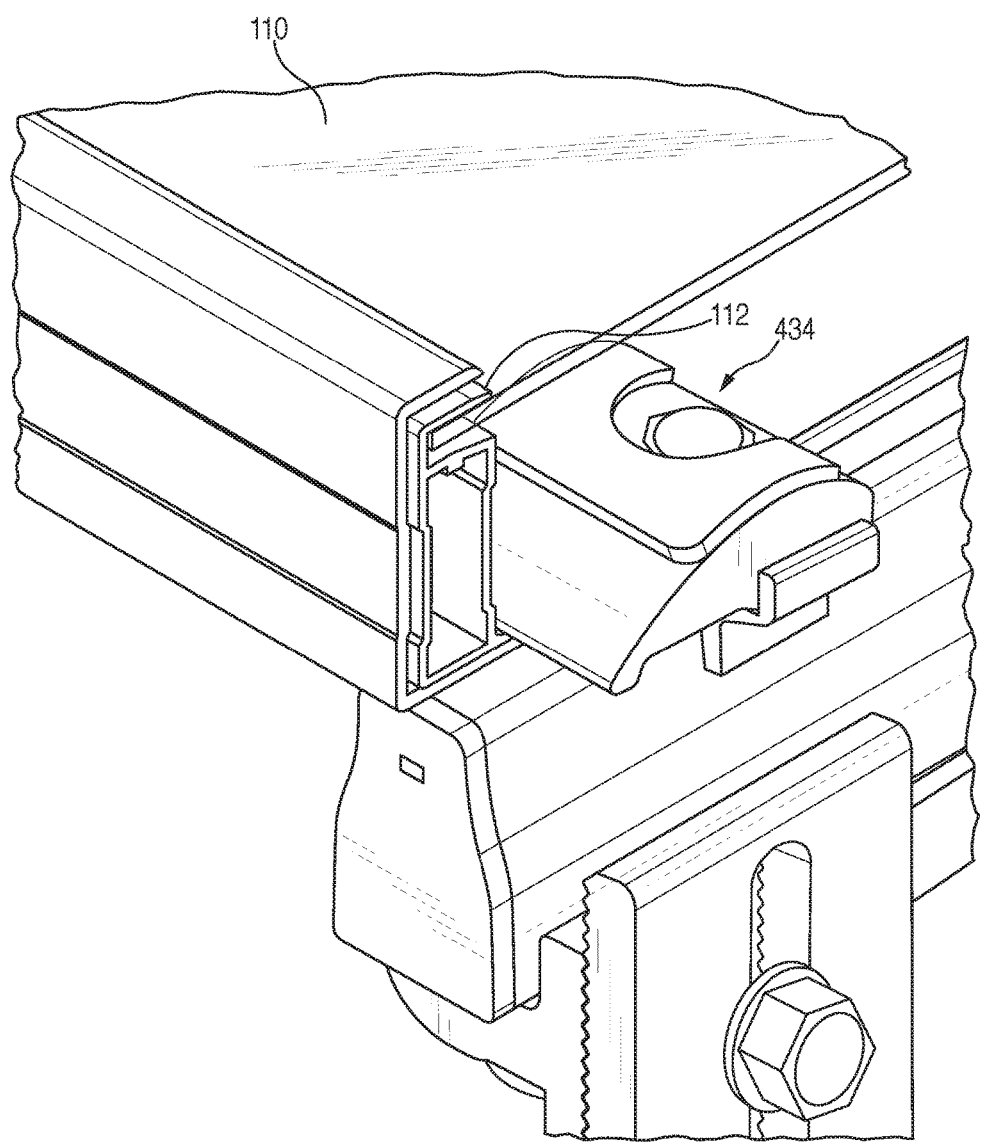

FIGS. 33A and 33B show perspective views of system 400, in accordance with various embodiments. In particular, FIGS. 33A and 33B illustrate that height-adjustable base members 420 are reversible.

As may be appreciated with reference to FIGS. 34-37, system 400 can employ spacers 438, which may be similar to spacers 238 and 338 disclosed above.

Figure 38:
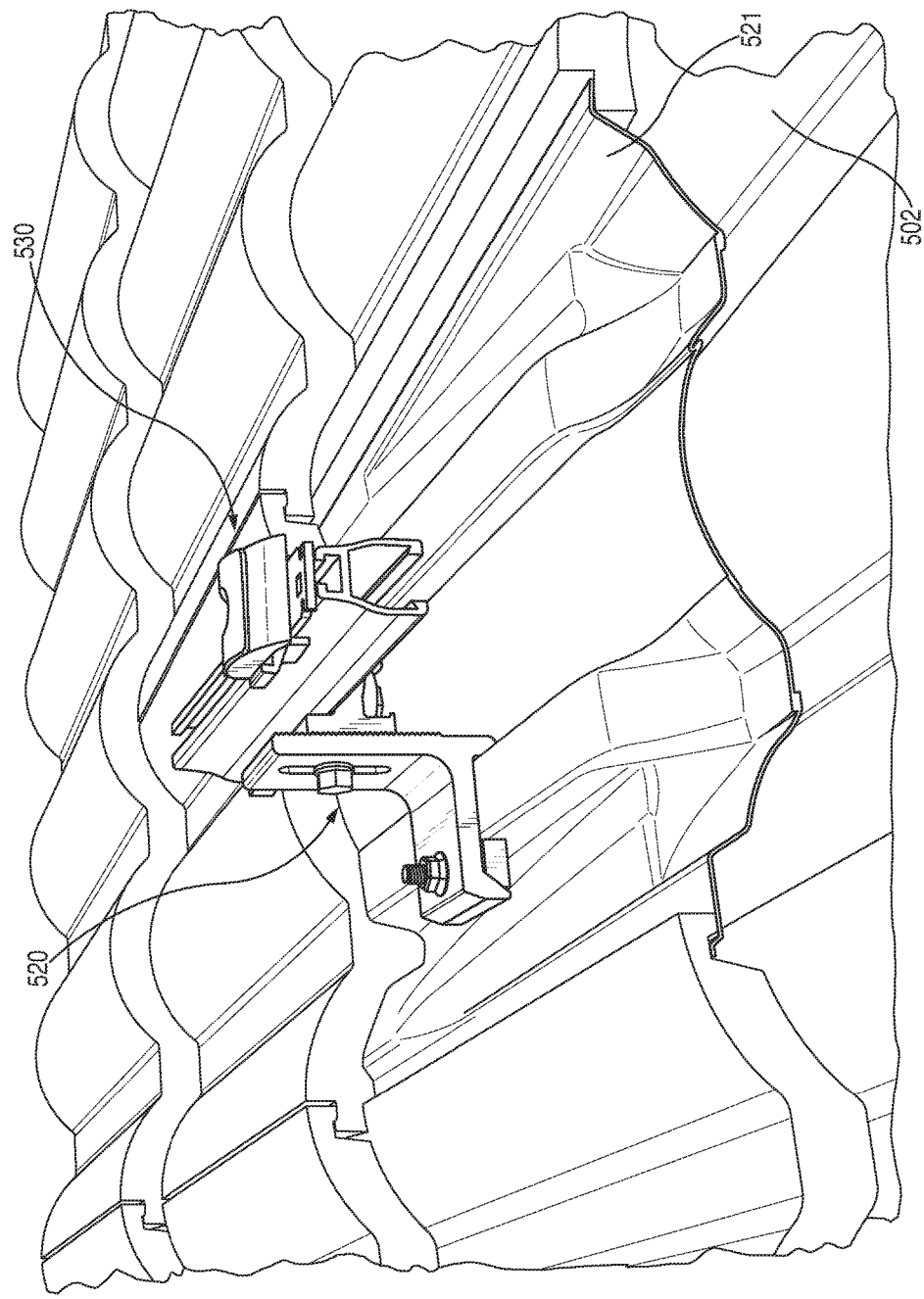
FIG. 38 shows a perspective view of a tiled roof mounting system for securing a solar panel system to a surface, in accordance with some embodiments.

FIG. 38 shows a perspective view of tiled roof mounting system 500 for securing a solar panel system to an installation surface 502, in accordance with some embodiments. Generally speaking, system 500 can include base member 521 couplable to installation surface 502 and height-adjustable base member 520 coupled to base member 521. Height-adjustable base member 520 may then serve as the mounting point for one or slidable-attachment members 530. While the embodiments disclosed herein are particularly suited for installing solar panel systems on a tiled roof, it should be understood that tiled roof mounting system 500 may be used in conjunction with other installation surfaces, such as shingled roofs, metal roofs, concrete roofs, and the like. Accordingly, installation surface 502 may be the surface underlying the tiles of a tiled roof.

Figure 39:
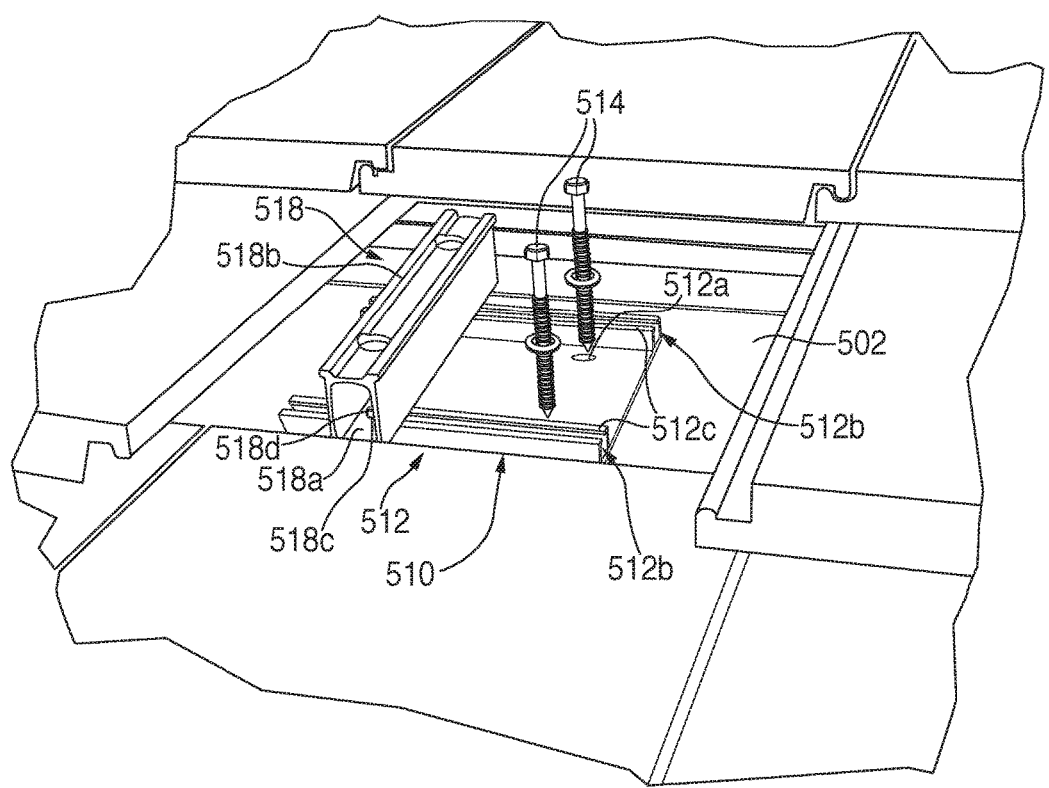
FIG. 39 shows a perspective view of a base plate being coupled to a structural member of a supporting surface, in accordance with various embodiments.

FIG. 39 shows a perspective view of base plate 512 of base member 510 being coupled to a structural member of installation surface 502, in accordance with various embodiments. The structural member may be, for example, a rafter underlying installation surface 502 (which has been omitted for clarity). Base plate 512 can include one or more apertures 512a for receiving fasteners 514. Fasteners 514 may be any suitable fasteners for coupling base plate 512 to the structural member, including bolts, screws, nails, and the like.

In addition to apertures 512a, base plate 512 can include one or more tracks, namely tracks 512b. Tracks 512b may be a substantially U-shaped structures defined by walls 512c, which can run substantially parallel to one another and which can extend away from base plate 512 in a direction pointing substantially perpendicularly away from surface 502, as installed. Walls 512c may include flanged ends configured to accept channel nuts having complementarily-shaped flanges. The flanges of walls 512c and the complementarily-shaped flanges of the channel nuts may permit one-dimensional movement of the channel nuts along tracks 512b, which can facilitate locational adjustment of mounting foot 518 with respect to base plate 512. Each channel nut can include a threaded aperture.

Mounting foot 518 can include coupling portion 518a and mounting fin 518b arranged substantially parallel to coupling portion 518a. Coupling portion 518a can include number of apertures 518c for accepting fasteners 518d, which may attach mounting foot 518 to the channel nuts. The number and placement of apertures 518c may, therefore, be dictated by the number of and lateral separation between tracks 512b. As shown in FIG. 39, base plate 512 includes two tracks 512b. However, base plate 512 may include any suitable number of tracks (e.g., one, two, five, etc.). Fasteners 518d can be inserted through apertures 518c to engage the threaded apertures of the channel nuts. Upon threadably engaging fasteners 518d with the threaded apertures, mounting foot 518 may be drawn against the ends of walls 512c, and the channel nuts may be drawn against the flanges in walls 512c, thereby locking mounting foot 518 and the channel nuts in place.

Figure 40:
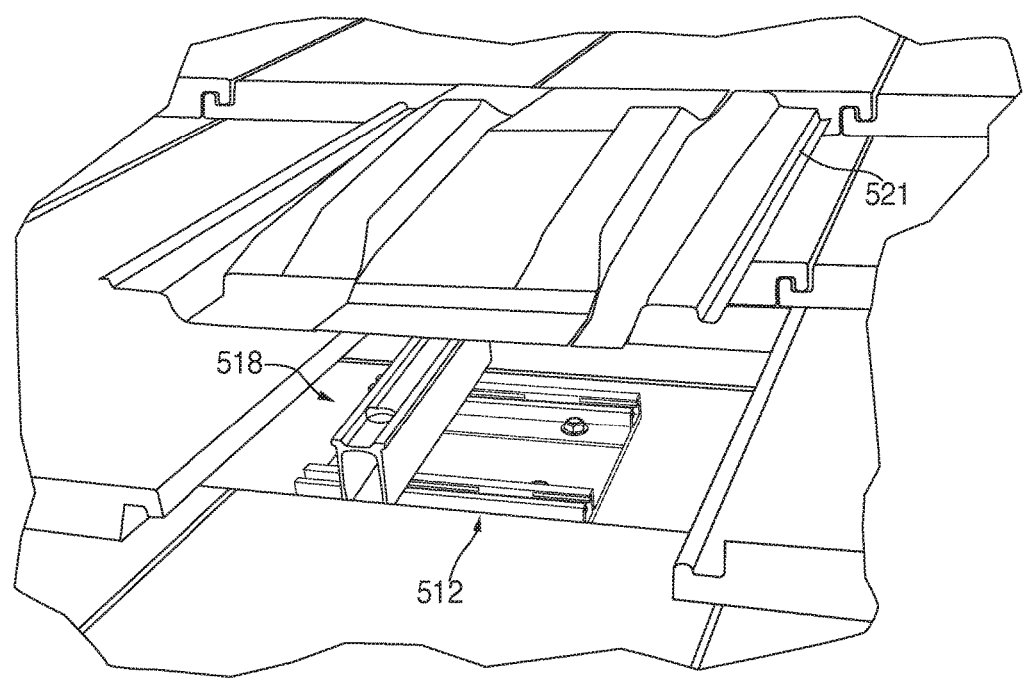
FIG. 40 shows an exploded perspective view of a mounting tile being lowered into place over a mounting fin, in accordance with some embodiments.

Mounting fin 518b may be configured to receive a channel formed in mounting tile 521. In particular, mounting fin 518b can have a cross-sectional profile that permits the channel of mounting tile receive mounting fin 518b in the channel. The keyed cross-sectional profile of mounting fin 518b may take on any suitable shape that facilitates attachment of a clamping L-foot (e.g., clamping L-foot 423). FIG. 40 shows an exploded perspective view of mounting tile 521 being lowered into place over mounting fin 518b.

Figure 41A:
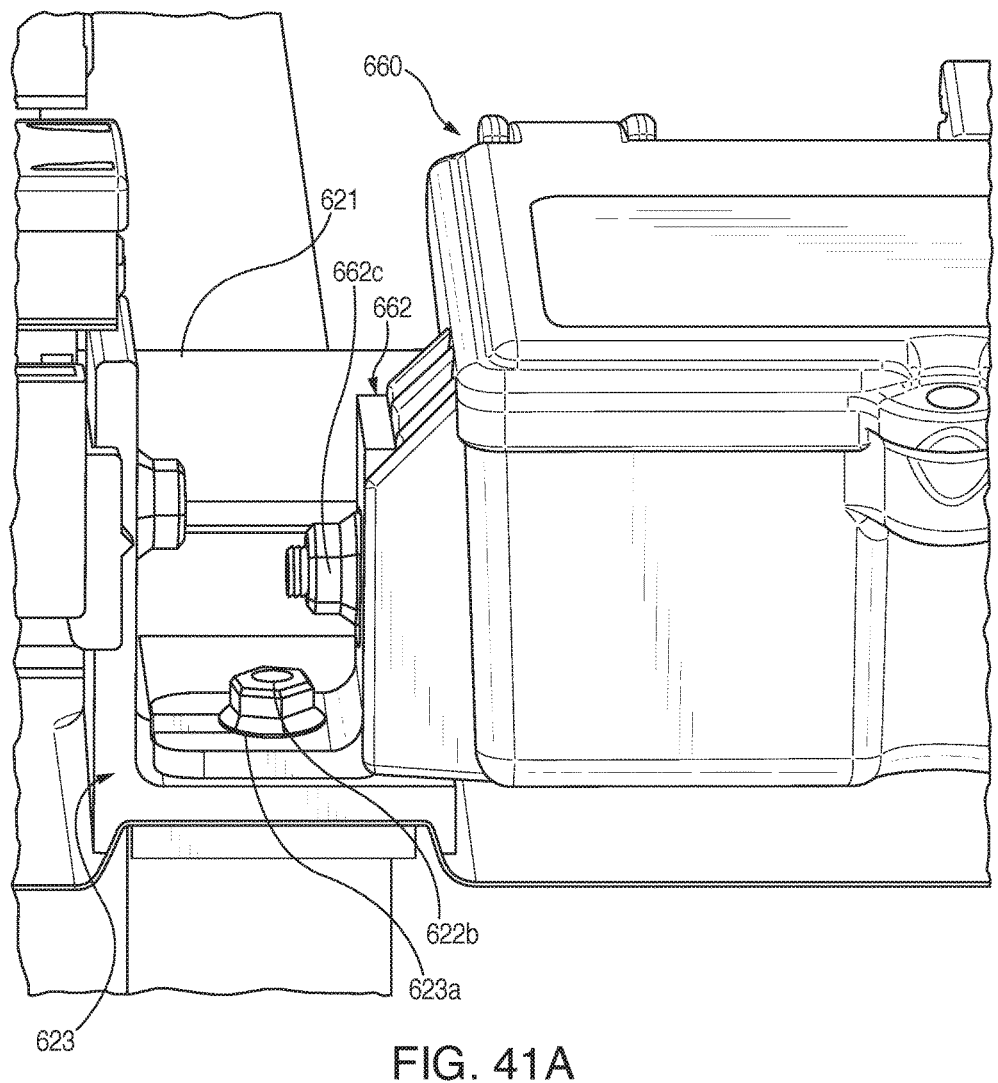
FIG. 41A shows a perspective view of a junction box installed over a base plate with a junction box L-foot, in accordance with various embodiments.

FIG. 41A shows a perspective view of junction box 660 installed over base plate 421 with junction box L-foot 662, in accordance with various embodiments. Junction box 660 may protect electrical connections made between various components of system 600. Junction box L-foot 662 may be installed over L-foot 623 (which may correspond to L-foot 223, L-foot 323, or L-foot 423, for example) using threaded stud 622b and nut 623a. In particular, threaded stud 622b may extend from a base member (not visible in FIG. 41A) through an aperture in L-foot 623 and slit 662a (shown in FIG. 41B) in junction box L-foot 662. L-foot 623 and junction box L-foot 662 can then be secured to base plate 621 using nut 623a.

Figure 41B:
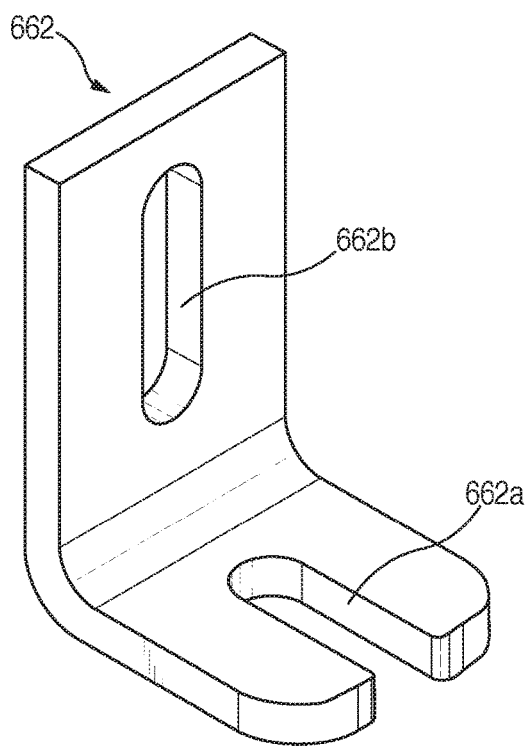
FIG. 41B shows a perspective view of a junction box L-foot, in accordance with various embodiments.
Figure 41C:
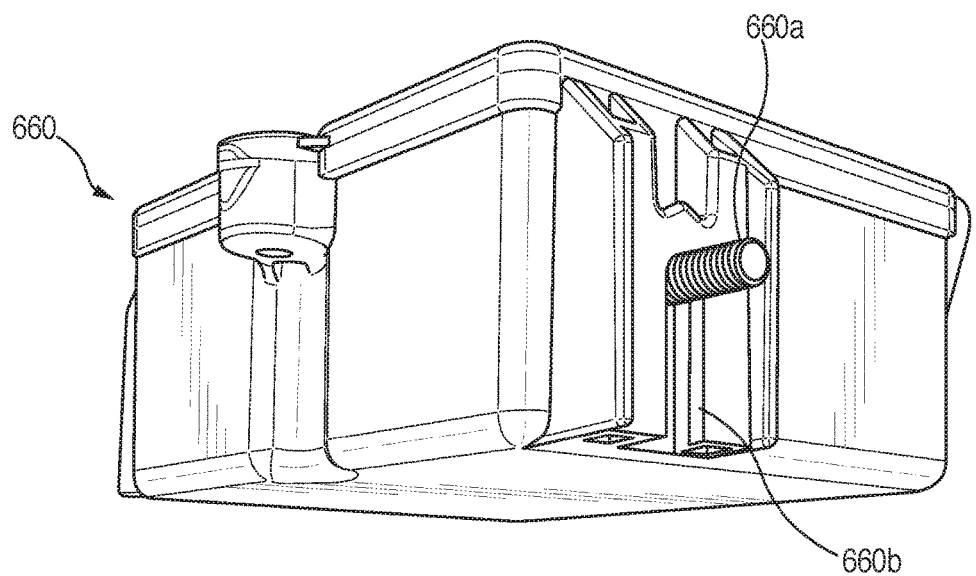
FIG. 41C shows a perspective view of a junction box, in accordance with various embodiments.

Junction box L-foot 662 may also include slot 662b for receiving fastener 660a that may extend from slit 660b of junction box 660. In particular, the head of fastener 660a may be retained within slit 660b, and the threaded portion of fastener 660a can extend through slot 662b of Junction box L-foot 662. Junction box 60 may then be fastened to junction box L-foot 662 using nut 662c. FIGS. 41B and 41C show perspective views of Junction box L-foot 662 and Junction box 660, respectively.

Figure 42A:
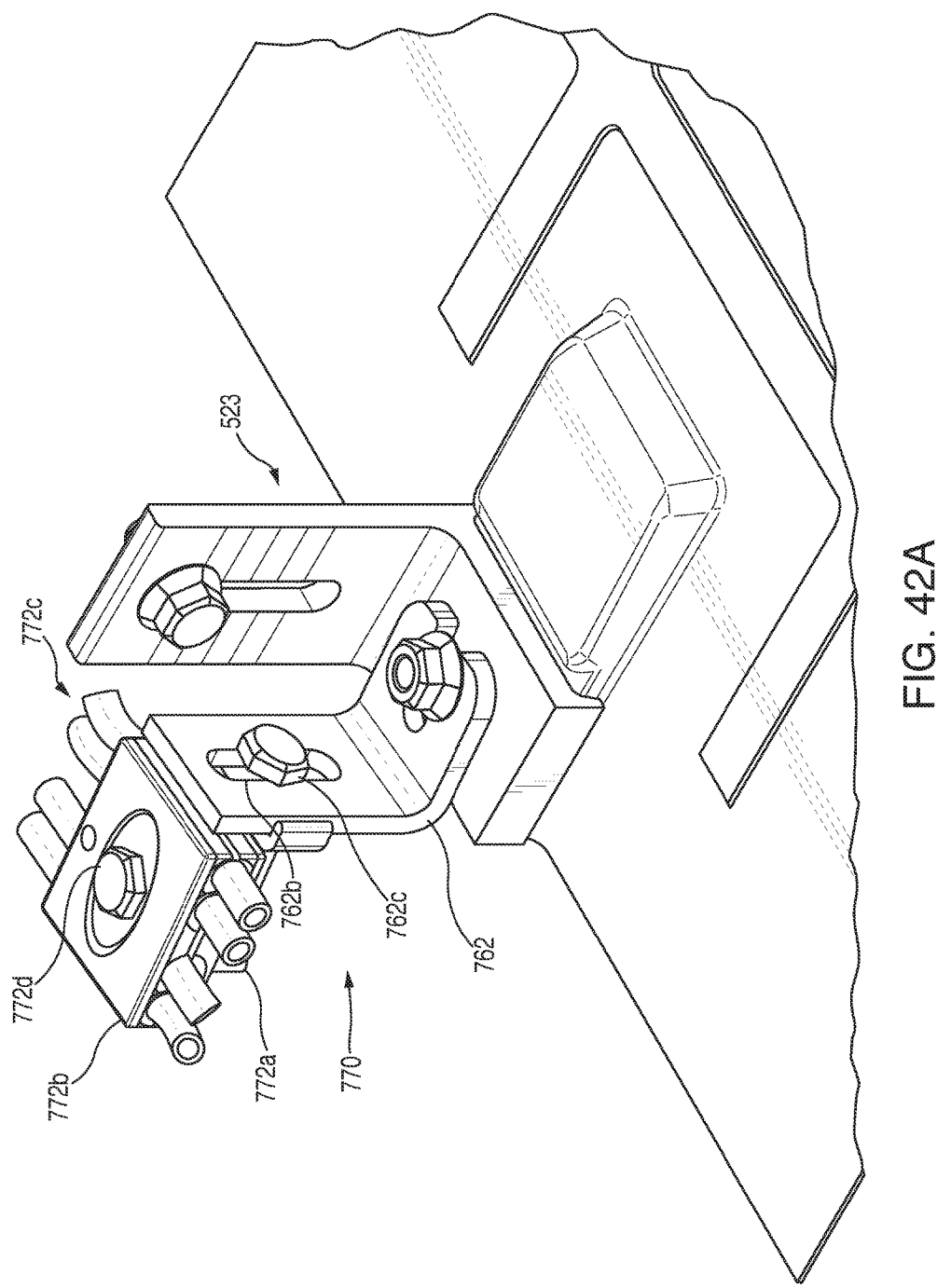
FIGS. 42A and 42B show perspective views of wire a management assembly, in accordance with various embodiments.

FIG. 42A shows a perspective view of wire management assembly 770, in accordance with various embodiments. Wire management assembly 770 can include L-foot 523, which may correspond to L-foot 223, 323, or 423, for example, wire management L-foot 762, which may be similar to junction box L-foot 662, and wire clamp 772.

Figure 42B:
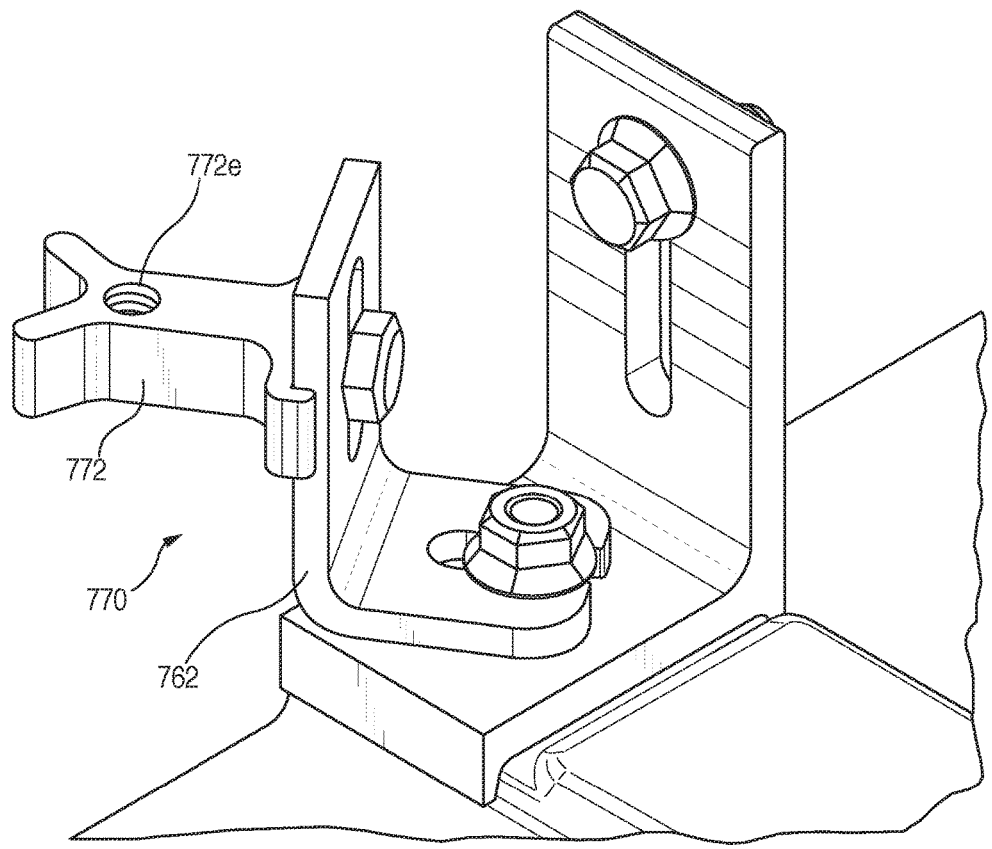
Figure 43A:
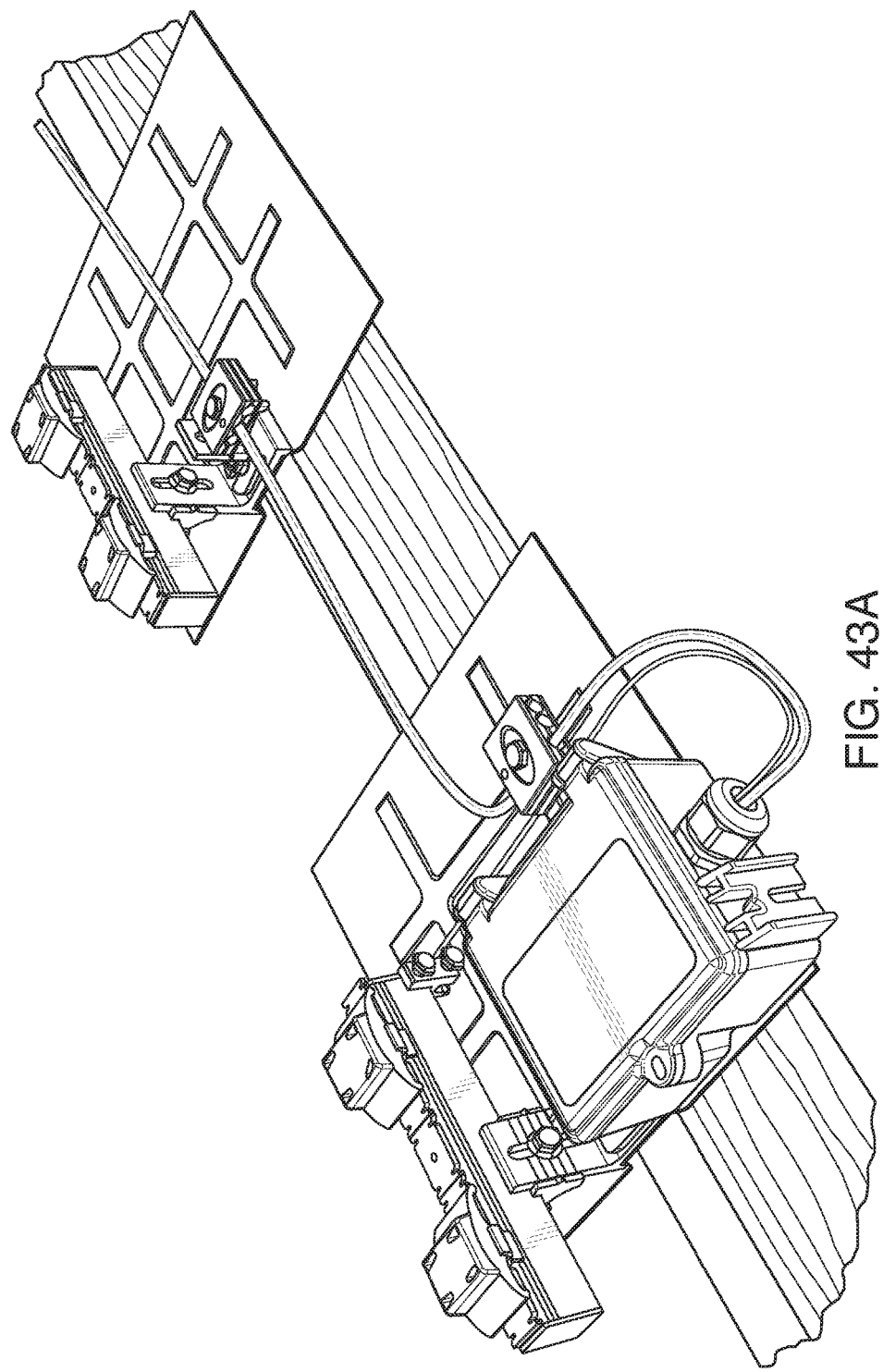
Figure 43C:
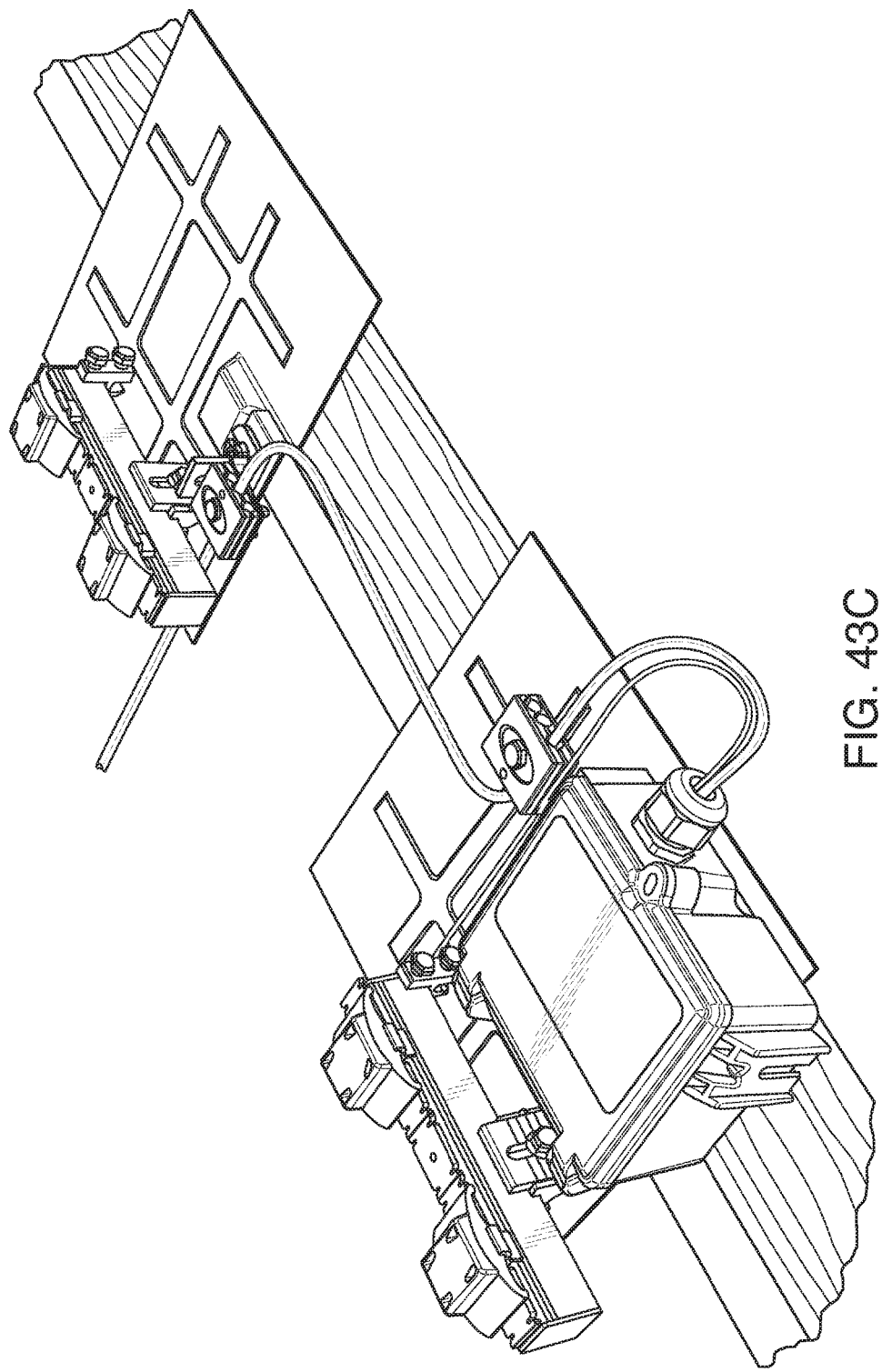

Wire clamp 772 (shown in FIG. 42B) may include a threaded bore that can receive threaded fastener 762c inserted through slot 762b in wire management L-foot 762. Threaded fastener 762c can thereby couple wire clamp 772 to wire management L-foot 762. The threaded bore may run through base member 772a of wire clamp 772, upon which wires 772c can be routed. Wires 772c can then be clamped into place by virtue of clamping member 772b being coupled to base member 772a. Clamping member 772b may include a number of channels for retaining wires 772c against base member 772a. Coupling between clamping member 772b and base member 772a may be effected using fastener 772d, which can extend through threaded bore 772e, visible in FIG. 42B. Wire clamp 772 may advantageously allow routing of wires 772d in a wide range of directions with respect to L-foot 723 as depicted in FIGS. 43A-43C.

FIG. 44 shows a flowchart of an exemplary process 400 for assembling a solar panel installation, in accordance with some embodiments.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed is:

1. A solar panel installation system, comprising:
    a height-adjustable base member couplable to an installation surface;
    a slidable attachment member coupled to the height-adjustable base member; and
    a solar module frame retention member coupled to or integrally formed with the slidable attachment member, wherein the height-adjustable base member is adjustable to vary the distance between the installation surface and the slidable attachment member, wherein the slidable attachment member is slidably adjustable in one dimension relative to the height-adjustable base member, wherein the slidable attachment member and the solar module frame retention member form at least one first horizontal slot configured to retain a horizontal flange of a solar module frame of a plurality of horizontal flanges substantially parallel to the installation surface, and wherein the solar module frame is configured with a second horizontal slot to retain a solar module.

2. The solar panel installation system of claim 1, further comprising the solar module frame retained by the solar module frame retention member.

3. The solar panel installation system of claim 1, further comprising:
    a second solar module frame retention member coupled to the slidable attachment member; and
    a second solar module frame comprising a flange, wherein the flange of the second solar module frame is retained by the second solar module frame retention member.

4. The solar panel installation system of claim 1, wherein the height-adjustable base member comprises a flashing.

5. The solar panel installation system of claim 4, further comprising:
    a fastener inserted through an aperture in the flashing coupling the height-adjustable base member to the installation surface.

6. The solar panel installation system of claim 4, wherein the height-adjustable base member comprises:
    an L-foot base located beneath the flashing;
    a fastener inserted through an aperture in the L-foot base coupling the L-foot base to the installation surface; and
    a clamping L-foot clamped to the L-foot base and the flashing.

7. The solar panel installation system of claim 1, wherein the height-adjustable base member comprises:
    a flashing,
    a vertical component coupled to the flashing, and
    a slidable attachment member coupling portion coupled to the vertical component.

8. The solar panel installation system of claim 7, wherein the vertical component comprises a hollow post configured to receive a fastener that extends through the flashing to couple the height-adjustable base member to an installation surface.

9. The solar panel installation system of claim 8, wherein the slidable attachment member comprises a support mechanism comprising:
    a cylindrically-shaped hollow member slidably receivable by the hollow post; and
    a locking member for slidably receiving and releasably coupling to the slidable attachment member.

10. The solar panel installation system of claim 7, wherein the vertical component comprises an L-foot having a vertical component arranged substantially perpendicular to the installation surface and a horizontal component arranged substantially parallel to the installation surface.

11. The solar panel installation system of claim 10, wherein the L-foot comprises:
    a longitudinal aperture for receiving a fastener; and
    an arm engagement surface, wherein the slidable attachment member coupling portion comprises an L-shaped arm comprising:
        a vertical component arranged substantially perpendicular to the installation surface and a horizontal component arranged substantially parallel to the installation surface; and
        an L-foot engagement surface oriented in a plane parallel to the arm engagement surface, wherein the fastener couples the L-foot engagement surface to the arm engagement surface.

12. The solar panel installation system of claim 11, wherein the arm engagement surface and L-foot engagement surface comprise textured surfaces configured to prevent movement of the arm relative to the L-foot.

13. The solar panel installation system of claim 10, wherein the L-foot comprises an aperture for receiving a fastener configured to couple the height-adjustable base member to the installation surface.

14. The solar panel installation system of claim 10, further comprising an L-foot base, the L-foot base comprising:
    at least one aperture configured to receive a fastener for coupling the L-foot base to the installation surface, wherein the L-foot base is located between the flashing and the installation surface.

15. The solar panel installation system of claim 14, wherein the L-foot comprises:
    a clamping wedge and a base-engagement leg extending substantially perpendicularly away from the horizontal component towards the installation surface, the clamping wedge comprising a sloped surface;
a base-coupling wedge comprising a sloped surface complementary to the sloped surface of the clamping wedge; and
a fastener extending from base-coupling wedge through an aperture in the horizontal portion, wherein tightening the fastener causes the base-engagement leg and the base-coupling wedge to be urged towards opposing sides of the L-foot base thereby clamping the L-foot to the L-foot base.

16. The solar panel installation system of claim 15, wherein the L-foot base comprises keyed channels for engaging the base engagement leg and the base-coupling wedge.

17. The solar panel installation system of claim 1, wherein the slidable attachment member is slidably releasable from the height-adjustable base member.

18. The solar panel installation system of claim 1, wherein the solar module frame retention member is removably coupled to a top surface of the slidable attachment member situated opposite the installation surface.

19. The solar panel installation system of claim 1, wherein the solar module frame is located at an edge of a solar module array.

20. The solar panel installation system of claim 3, wherein the first and second solar module frames are located at in interior location of a solar module array.

* * * * *